(12) United States Patent
Zhu et al.

(10) Patent No.: US 10,169,549 B2
(45) Date of Patent: Jan. 1, 2019

(54) DIGITAL IMAGE PROCESSING INCLUDING REFINEMENT LAYER, SEARCH CONTEXT DATA, OR DRM

(71) Applicant: Adobe Systems Incorporated, San Jose, CA (US)

(72) Inventors: Zhe Zhu, Beijing (CN); Scott D. Cohen, Sunnyvale, CA (US); Brian L. Price, San Jose, CA (US)

(73) Assignee: Adobe Inc., San Jose, CA (US)

( * ) Notice: Subject to any disclaimer, the term of this patent is extended or adjusted under 35 U.S.C. 154(b) by 55 days.

(21) Appl. No.: 15/474,679

(22) Filed: Mar. 30, 2017

(65) Prior Publication Data

US 2018/0285535 A1 Oct. 4, 2018

(51) Int. Cl.
G06F 21/00 (2013.01)
G06F 21/10 (2013.01)
G06F 3/0484 (2013.01)
G06N 99/00 (2010.01)
G06Q 30/06 (2012.01)
G06F 17/30 (2006.01)

(52) U.S. Cl.
CPC .......... *G06F 21/10* (2013.01); *G06F 3/04845* (2013.01); *G06F 17/30657* (2013.01); *G06N 99/005* (2013.01); *G06Q 30/0601* (2013.01)

(58) Field of Classification Search
None
See application file for complete search history.

(56) References Cited

U.S. PATENT DOCUMENTS

| 6,959,116 | B2* | 10/2005 | Sezer | G06T 9/005 375/240.03 |
|---|---|---|---|---|
| 7,545,967 | B1 | 6/2009 | Prince et al. | |
| 8,270,731 | B2* | 9/2012 | Wang | G06K 9/629 382/224 |
| 8,352,443 | B1* | 1/2013 | Polson | G06T 17/00 382/293 |
| 8,682,079 | B1* | 3/2014 | Ouzounis | G06K 9/00637 382/190 |

(Continued)

OTHER PUBLICATIONS

Tsai, Yu-Pao et al. Background Removal of Multiview Images by Learning Shape Priors. IEEE Transactions on Image Processing, vol. 16, Issue: 10. https://ieeexplore.ieee.org/stamp/stamp.jsp?tp=&arnumber=4303155 (Year: 2007).*

(Continued)

*Primary Examiner* — Jeremiah L Avery
(74) *Attorney, Agent, or Firm* — Wolfe-SBMC

(57) ABSTRACT

Techniques and systems are described to support digital image processing through use of an image repository, e.g., a stock image database or other storage. In one example, a plurality of candidate digital images are obtained from an image repository based on a target digital image. A plurality of transformations are generated to be applied to the target digital image, each transformation based on a respective candidate digital image. Semantic information is employed as part of the transformations, e.g., blending, filtering, or alignment. A plurality of transformed target digital images are generated based at least in part through application of the plurality of transformations to the target image.

20 Claims, 18 Drawing Sheets

(56) References Cited

U.S. PATENT DOCUMENTS

| | | | |
|---|---|---|---|
| 2006/0165315 A1* | 7/2006 | Ernst | H04N 19/20 |
| | | | 382/302 |
| 2008/0168135 A1* | 7/2008 | Redlich | G06Q 10/10 |
| | | | 709/204 |
| 2008/0304743 A1 | 12/2008 | Tang et al. | |
| 2009/0226060 A1* | 9/2009 | Gering | G06T 7/11 |
| | | | 382/128 |
| 2009/0254572 A1* | 10/2009 | Redlich | G06Q 10/06 |
| 2010/0010968 A1* | 1/2010 | Redlich | G06F 17/30672 |
| | | | 707/E17.014 |
| 2010/0135527 A1* | 6/2010 | Wu | G06K 9/00664 |
| | | | 382/103 |
| 2011/0069755 A1* | 3/2011 | Bethge | H04N 19/176 |
| | | | 375/240.03 |
| 2015/0170006 A1 | 6/2015 | Cohen et al. | |
| 2015/0227817 A1 | 8/2015 | Lin et al. | |
| 2015/0354976 A1* | 12/2015 | Ferencz | G01C 21/3602 |
| | | | 382/104 |
| 2016/0253466 A1* | 9/2016 | Agaian | G06N 3/0427 |
| | | | 382/128 |
| 2016/0335524 A1 | 11/2016 | Bremer et al. | |
| 2016/0350930 A1 | 12/2016 | Lin et al. | |
| 2016/0358337 A1 | 12/2016 | Dai | |
| 2016/0364625 A1 | 12/2016 | Lin et al. | |
| 2018/0211393 A1 | 7/2018 | Chen et al. | |
| 2018/0286023 A1 | 10/2018 | Zhu et al. | |

OTHER PUBLICATIONS

Zheng-Lei et al. Design and Analysis of a Content-Based Pathology Image Retrieval System. IEEE Transactions on Information Technology in Biomedicine, vol. 7, Issue: 4. https://ieeexplore.ieee.org/stamp/stamp.jsp?tp=&arnumber=1263897 (Year: 2003).*

Vu, Dung T. et al. Efficient Hybrid Tree-Based Stereo Matching With Applications to Postcapture Image Refocusing. IEEE Transactions on Image Processing, vol. 23, Issue: 8. https://ieeexplore.ieee.org/stamp/stamp.jsp?tp=&arnumber=6826503 (Year: 2014).*

Farbman,"Convolution Pyramids", ACM Trans. Graph. 30, 6, Nov. 2012, 9 pages.

Farbman,"Coordinates for Instant Image Cloning", ACM Trans. Graph. 28, 3, Jul. 27, 2009, 9 pages.

Yu,"Multi-Scale Context Aggregation by Dilated Convolutions", Computer Vision and Pattern Recognition, Apr. 2016, 13 pages.

Zhu,"Learning a Discriminative Model for the Perception of Realism in Composite Images", Computer Vision and Pattern Recognition, Oct. 2015, 9 pages.

"Pre-Interview First Office Action", U.S. Appl. No. 15/474,459, dated Nov. 21, 2018, 4 pages.

Faria,"Learning to Rank for Content-Based Image Retrieval", In Proceedings of the international conference on Multimedia information retrieval (MIR '10). (Year: 2010), Mar. 2010, 10 pages.

* cited by examiner

DIGITAL IMAGE PROCESSING INCLUDING REFINEMENT LAYER, SEARCH CONTEXT DATA, OR DRM

BACKGROUND

Digital image processing techniques provide a variety of different ways for a computing device to transform a digital image. In some instances, a portion used to generate a transformation is taken from the digital image itself or another digital images as part of a digital image processing technique. Examples of digital image processing techniques that employ such a portion include hole filling, object removal, and so on in which the portion is used as a source by the computing device to generate a transformation, i.e., "how" the digital image is processed such as a fill used as part of hole filling. The generated transformation is then applied to the digital image to perform a corresponding digital image processing technique, e.g., to fill a hole within the image, replace an object with another object, and so forth.

Consequently, accuracy and effectiveness of these digital image processing techniques as performed by a computing device are constrained by accuracy of the source in representing a subject of the transformation, such as a "fill" for a hole. As a result, conventional digital image processing techniques may fail when the source does not accurately reflect a subject of the transformation and thus result in a filled hole in the digital image that appears out-of-context with other portions of the digital image. For example, other portions of a digital image may not accurately describe a hole in the digital image. Thus, the other portions, when relied upon as a source of a transformation to fill the hole in the digital image, may result in generation of the transformation that lacks realism when applied to the digital image.

SUMMARY

Digital image processing techniques and systems are described that leverage an image repository (e.g., a collection of stock images, a user's personal collection of digital images, and so forth) and thus expand availability and accuracy of digital images that are usable as a source for generation of a transformation to a target digital image. In one instance, the semantic labels are used to filter semantically incorrect transformations. In another instance, the semantic labels are used to generate the transformations, e.g., through alignment of the transformation to the target digital image. In a further instance, the semantic labels are used to blend the transformation as part of the target digital image.

Techniques and systems are also described to rank processed digital images based on realism exhibited by the images through use of image ranking scores. The image ranking scores are indicative of an amount of realism exhibited by respective transformed target digital images, i.e., target digital images having a respective transformation applied.

Techniques and systems are further described to provide a result of the image processing by a computing device that has increased richness over conventional techniques. This is achieved through use of a refinement layer that is configured in this example to include data that is generated as part of creation and application of the transformation to the target digital image. The refinement layer, for instance, may include controls, sliders, and even a source of the transformation (e.g., a stock digital image) that are usable to refine the transformation based on how the transformation was formed. Accordingly, a user that receives the transformed target digital image with the refinement layer may further continue processing of the image without being forced to "start from scratch."

Techniques and systems are also described in which digital rights management is used to protect transformed target digital images until rights to license or purchase candidate digital images used to generate the transformation are obtained. In this way, the user may be provided with a variety of options and purchase or license a desired option without purchasing or licensing other digital images that are not desired for use as a source in generating the transformation.

Techniques and system are also described to refine a basis for the search used to locate digital images from the image repository through use of search context data. The search context data, for instance, may include replacement content (e.g., a dog placed over a car) in the target digital image which is then used to perform the image search. In another instance, text search data is included to guide the search. Further discussion of these and other examples is included in the following sections.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
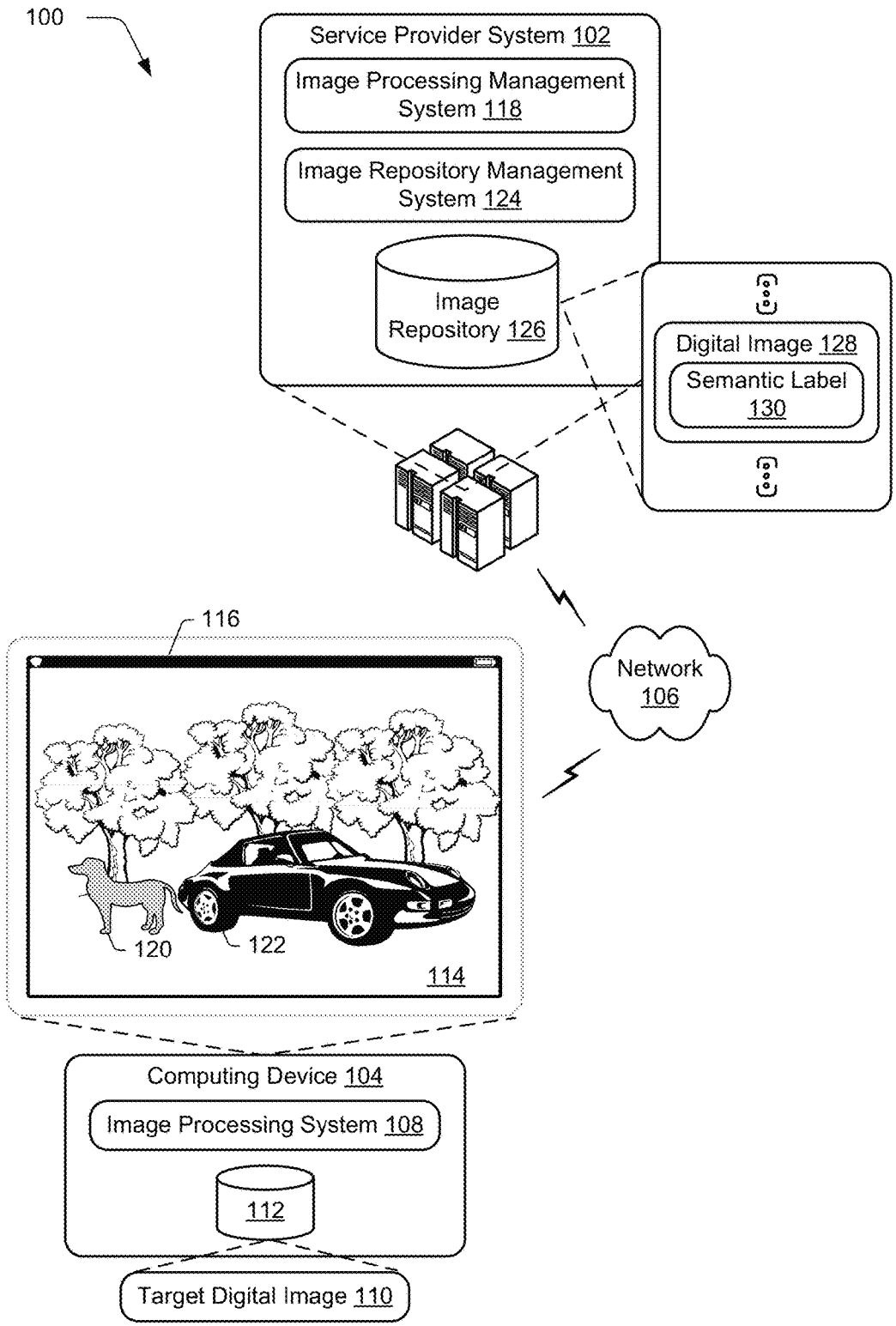
FIG. 1 is an illustration of an environment in an example implementation that is operable to employ techniques described herein.

Digital image processing techniques have been developed to transform digital images in a variety of ways through use of a computing device. In some instances, the computing device depends on a source to generate a transformation that is then applied to a digital image, such as to fill a hole, remove an object, and so forth. Accordingly, the source defines "what" is contained in the transformation, and thus limits accuracy and effectiveness of these techniques when performed by the computing device, e.g., to provide a realistic fill for a hole, replace an object, and so forth.

Accordingly, techniques and systems are described in which digital image processing employs an image repository to generate a transformation to be applied to a target digital image. The image repository, for instance, may be part of a stock image database that makes stock digital image available for licensing or purchase. The image repository may thus include hundreds of thousands and even millions of digital images that are made available for licensing or purchase. Additionally, the image repository may also support increased richness in describing the digital images through use of semantic labels that describe "what" and even "where" objects are included in the image, which is not commonly available in conventional digital images. In another example, the image repository may include a user's personal collection of digital images.

In the techniques and systems described herein, the image repository is leveraged as part of image processing to expand an availability of a source that is used as a basis to perform an image processing technique, such as for hole filling, object removal, and so forth. Further, this may also be performed with increased accuracy and efficiently by leveraging semantic labels. As a result, the techniques and system described herein may improve accuracy and realism exhibited by the image processing techniques as performed by a computing device over conventional techniques having limited source availability.

In one example, the semantic labels are used to filter semantically incorrect transformations. An image processing management system, for instance, may be configured to generate transformations for a target digital image based on a plurality of candidate digital images from an image repository, e.g., a stock image database. A semantic filtering module is then used to filter semantically incorrect transformations based on semantic labels assigned to pixels in the target digital image and the transformations as formed from the candidate digital images. The semantic filter module, for instance, may identify and remove transformations in which the sky is depicted as surrounded by the ground within the image based on respective semantic labels through use of machine learning. In this way, a transformed target digital image may be generated from the filtered transformations having increased accuracy by a computing device over conventional techniques that is semantically correct and thus has an increased likelihood of appearing real. Further, this may improve efficiency in computational resource consumption and thus provide technological advantages by arriving at this result in fewer iterations through this increased accuracy and realism.

In another example, the semantic labels are used to generate the transformations. Like before, the image processing management system generates transformations for a target digital image based on a plurality of candidate digital images from an image repository, e.g., a stock image database. The transformations, for instance, may be used to fill a portion of an image (e.g., a hole, portion from which an object was removed, etc.), which are aligned within the portion based respective semantic labels, e.g., to align objects in the transformation with the target digital image. In another example, the semantic labels are used to blend the transformation as part of the target digital image. This may include controlling blending such that corresponding objects are blended together (e.g., different parts of the ground) whereas objects that do not correspond to each other are not (e.g., the ground and sky). In this way, the semantic labels promote use of a transformation having increased accuracy over conventional techniques that is semantically correct and increased realism and thus supports numerous technological and computational advantages as described above. Further discussion of this and other examples is included in the following sections and described in relation to FIGS. 3-9.

Techniques and systems are also described to rank processed digital images based on realism exhibited by the images. For example, an image processing management system may generate a plurality of transformations for a target image based on digital images from an image repository. A machine learning model, learned from a plurality of training digital images by a computing device, is then employed by the system to generate image ranking scores. The image ranking scores are indicative of an amount of realism exhibited by respective transformed target digital images, i.e., target digital images having a respective transformation applied.

The machine learning model, for instance, may be trained to identify characteristics that are indicative of realism (e.g., sky over ground) as well as characteristics that are not (e.g., ground over sky). The image ranking scores are thus descriptive of an amount of realism of respective characteristics and combined to arrive at an overall score for each transformed target digital image. The image ranking scores may be leveraged in a variety of ways, such as to expose candidate digital images having transformations that appear realistic, as part of an image search, and so forth. Further discussion of this and other examples is included in the following sections and described in relation to FIGS. 10-11.

Techniques and systems are also described to provide a result of the image processing by a computing device that has increased richness over conventional techniques. For example, conventional results of image processing are configured for rendering and thus provide a result of the image processing performed but do not indicate how that image processing was achieved. Therefore, any subsequent modifications that are desired again start from a finished image, which is inefficient and frustrating.

Accordingly, a refinement layer is configured in this example that includes data that is generated as part of creation and application of the transformation to the target digital image. The refinement layer, for instance, may include controls, sliders, and even a source of the transformation (e.g., a stock digital image) that are usable to refine the transformation based on how the transformation was formed. Accordingly, a user that receives the transformed target digital image with the refinement layer may further continue processing of the image without being forced to "start from scratch," and thus promotes increased computational efficiency. Further discussion of this and other examples is included in the following sections and described in relation to FIGS. 12-13.

Returning to the initial example, the image processing management system may employ the image repository as a source for transformation of digital images. The image repository, for instance, may be configured to include digital images (e.g., stock digital images) that are available for licensing or purchase. The system may then use this collection to generate several different transformed target digital images and protect these digital images using digital rights management, e.g., a watermark, as a down-sampled version, and so forth. A user may then view these several different transformed target digital images to select a desired result and obtain access to that result through licensing or purchase of a corresponding digital image from the image repository.

In this way, the user may be provided with a variety of options and purchase or license a desired option without purchasing or licensing other digital images that are not desired for use as a source in generating the transformation. Following the previous example, the corresponding digital image from the image repository may also be included as part of the refinement layer to support further processing. Further discussion of this and other examples is included in the following sections and described in relation to FIG. 14-16.

The digital rights management system may also support techniques to refine a basis for the search used to locate digital images from the image repository. For example, a user may interact with a computing device to modify a digital image in order to replace an object included in the digital image with another. Accordingly, the digital image, if including the object, may skew a search result by also including that object. Accordingly, search context data may be provided along with the target digital image in order to clarify an actual intent of the search.

The search context data, for instance, may include replacement content (e.g., a dog placed over a car) in the target digital image which is then used to perform the image search and thus return images with dogs instead of car that may be used to remove the car from the image. In another instance, text search data is included (e.g., "dog") to guide the search. As a result, the search result has a greater likelihood of accuracy and reduced computational resource consumption (e.g., through avoidance of repeated inaccurate searches) in processing of the target digital image. Further discussion of this and other examples is also included in the following sections and described in relation to FIG. 14.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a service provider system 102 and a computing device 104, which may be implemented using a variety of different configurations of computing devices.

A computing device, for instance, may be configured as a desktop computer, a laptop computer, a mobile device (e.g., assuming a handheld configuration such as a tablet or mobile phone as illustrated), and so forth. Thus, the computing device may range from full resource devices with substantial memory and processor resources (e.g., personal computers, game consoles) to a low-resource device with limited memory and/or processing resources (e.g., mobile devices). Additionally, the computing device may be representative of a plurality of different devices, such as multiple servers utilized by a business to perform operations "over the cloud" as illustrated for the service provider system 102 and as described in FIG. 17.

The computing device 104 is illustrated as including an image processing system 108. The image processing system 108 is implemented at least partially in hardware of the computing device 104 to process and transform a target digital image 110, which is illustrated as maintained in storage 112 of the computing device 104, e.g., a database or other computer-readable storage media. The target digital image 110 is referred to as such as being a target of image editing operations in the following discussion. Such processing includes creation of the target digital image 110, modification of the target digital image 110, and rendering of the target digital image 110 in a user interface 114 for output, e.g., by a display device 116.

Although illustrated as implemented locally at the computing device 104, functionality of the image processing system 108 may also be implemented as whole or part via functionality available via the network 106, such as part of a web service or "in the cloud" by the service provider system 102. For example, an image processing management system 118 may expose functionality to the image processing system 108 via the network 106 to perform image editing operations on the target digital image 110, thus transforming the image. Although the following discussion refers to performance of the image editing operations by the image processing management system 118, these operations may also be performed in whole or in part by the image processing system 108.

As previously described, some image editing operations are dependent on a source, which may include the image itself or another image. In order to fill a portion of the target digital image 110, replace an object in the target digital image 110, and so forth an image editing operation may leverage the source (e.g., a single or multiple digital images)

to "fill in" the portion, replace the object and so forth. Accordingly, accuracy of the source in describing "what is to be filled" in the target digital image 110 also controls accuracy of these image editing operations. Although conventional techniques have operated well when confronted with images having simple or textured backgrounds (e.g., the sky or the ground in the illustrated example), these techniques lack accuracy when confronted with structured or complex scene, e.g., objects such as the dog 120 and car 122.

Accordingly, techniques and systems are described in which an image repository management system 124 having an image repository 126 of digital images 128 is leveraged to provide a source to support these image editing operations. The image repository 126, for instance, may be configured as a stock database that includes millions of different types of images including a multitude of different objects in different image scenes. In another example, the image repository 126 includes a user's personal collection of digital images. Regardless of configuration, richness of diversity of the image repository 126 when acting as a source is leveraged in the following to increase accuracy and efficiency in image editing operations that rely on a source.

Additionally, the techniques described herein may also leverage semantic labels 130 associated with the digital images 128 in the image repository 126. The semantic labels 130, for instance, may describe "what" is represented by respective pixels in the digital image 128, e.g., identify particular objects. Accordingly, this may be leveraged in a variety of ways by the image processing management system 118 to increase accuracy in generation of transformations for the target digital image 110 based on the digital images 128 in the image repository 126. In one example, semantic filtering is performed by the image processing management system 118 to remove candidate transformations that lack realism, e.g., sky surrounded by ground, through use of the semantic labels 130.

In another example, the transformations used to fill a portion of an image (e.g., a hole, portion from which an object was removed, etc.) are aligned within the portion of the target digital image 110 based respective semantic labels 130, e.g., to align objects in the transformation with the target digital image. Additionally, the semantic labels 130 may be used to blend the transformation as part of the target digital image 110. This may include controlling blending such that corresponding objects are blended together (e.g., different parts of the ground) whereas objects that do not correspond to each other are not (e.g., the ground and sky). In this way, the semantic labels promote use of a transformation having increased accuracy over conventional techniques that is semantically correct and increased realism and thus supports numerous technological and computational advantages as described above.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Image Repository and Semantic Labels

Figure 2A:
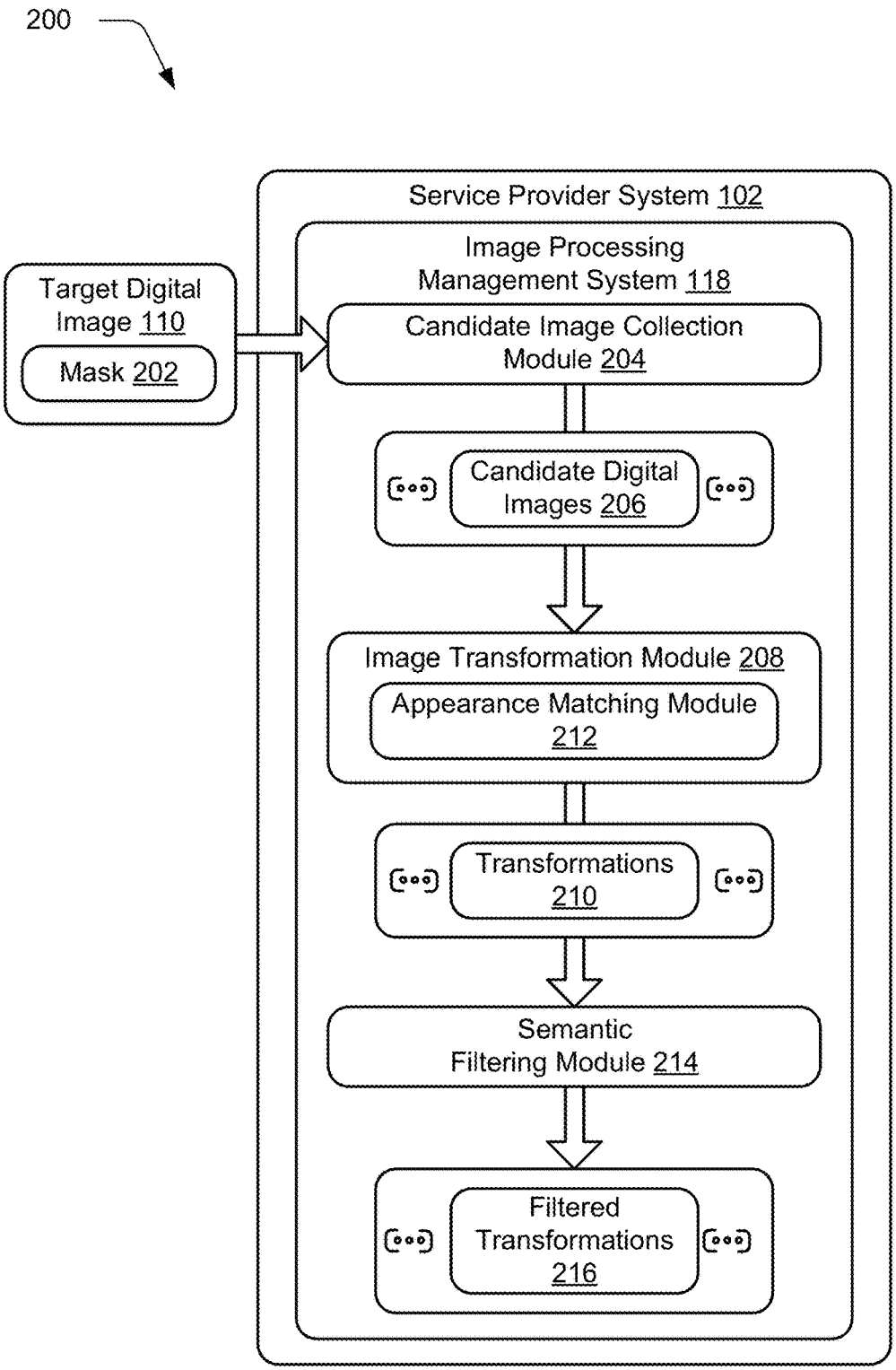
FIGS. 2A and 2B describe systems in an example implementation in which an image repository having digital images that are semantically labelled is used as a source to transform a target digital image.
Figure 2B:
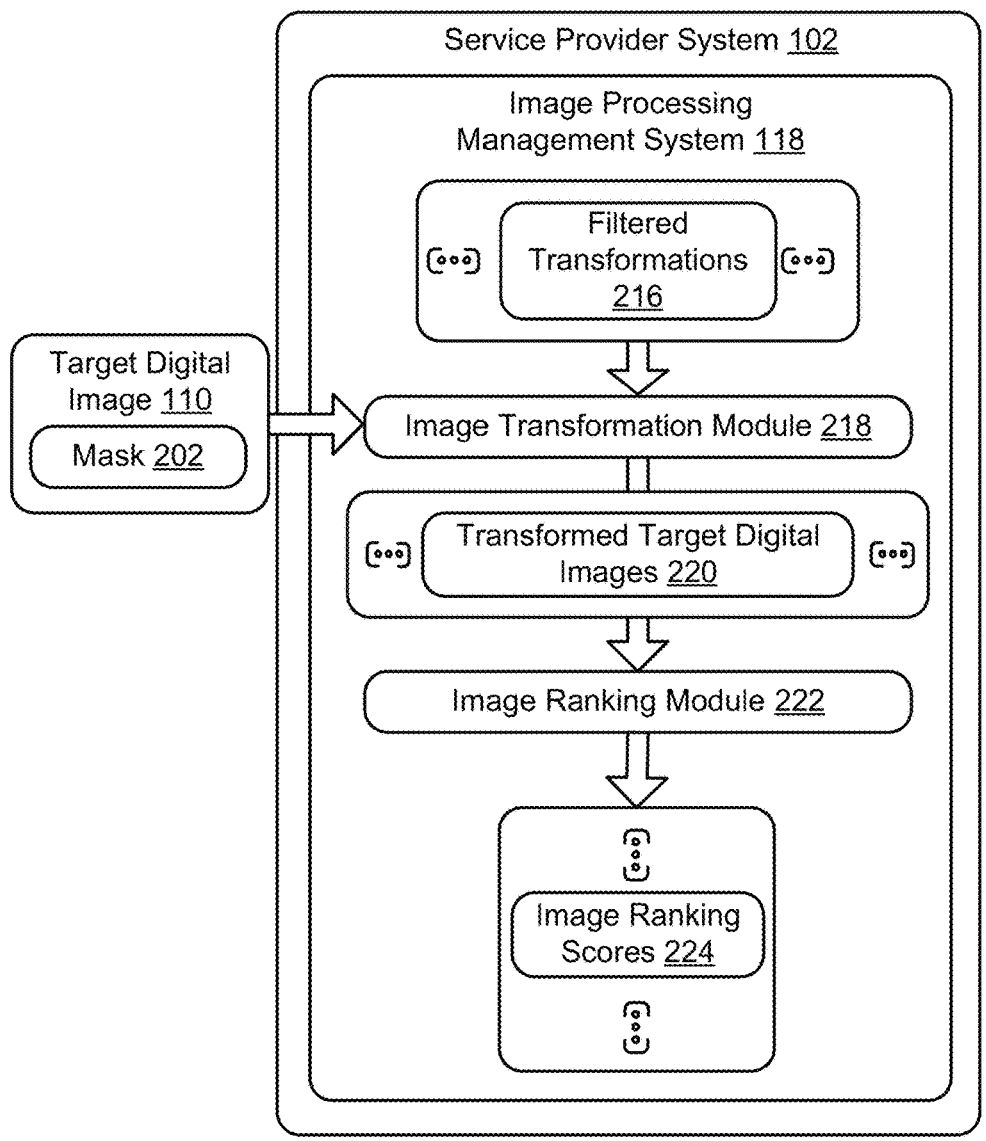
Figure 3:
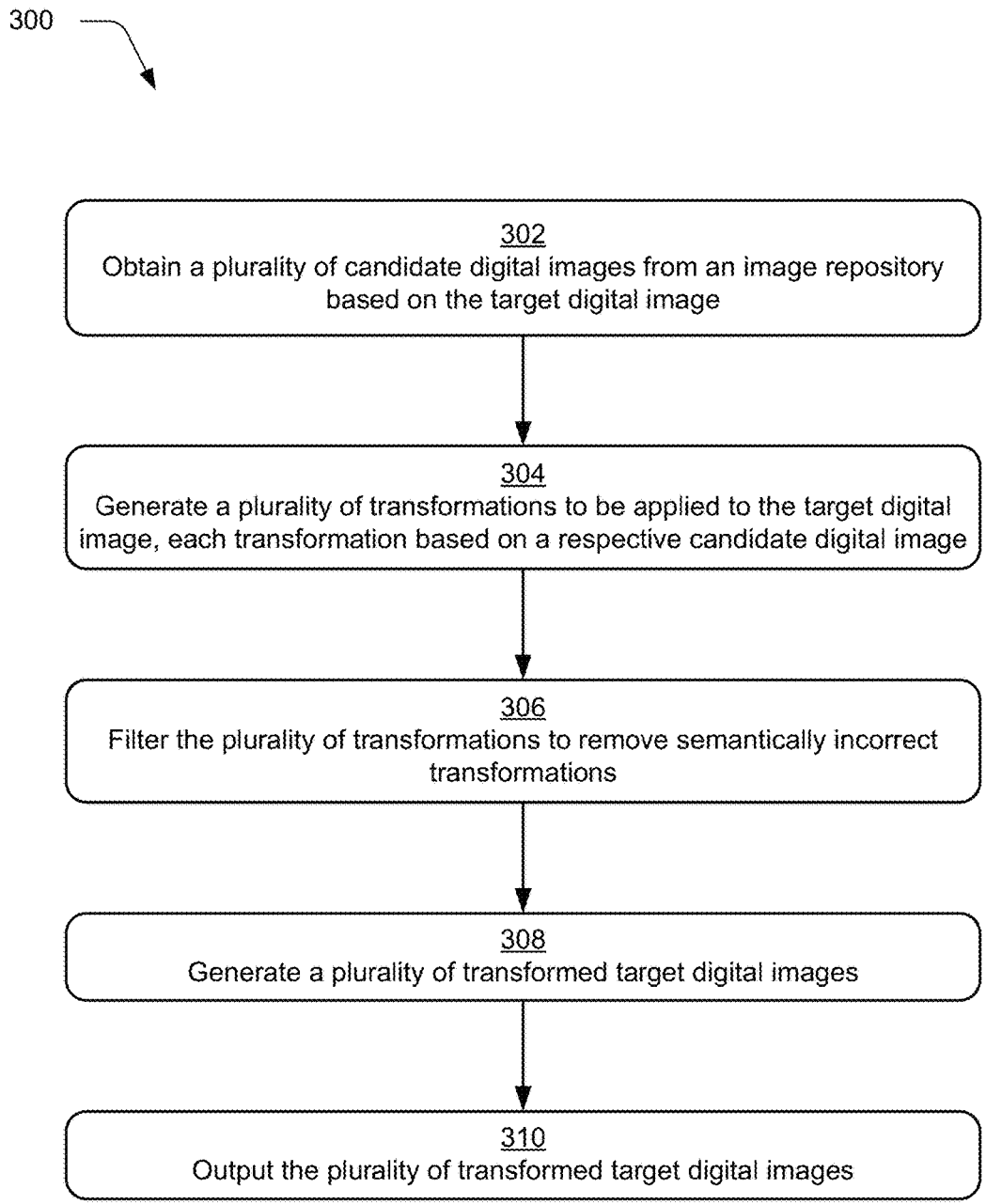
FIG. 3 is a flow diagram depicting a procedure in an example implementation of generation of a transformed target digital image through use of an image repository.

FIGS. 2A and 2B describe systems 200, 250 in an example implementation in which an image repository having digital images that are semantically labelled is used as a source to transform a target digital image. FIG. 3 depicts a procedure 300 in an example implementation of generation of a transformed target digital image through use of an image repository.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 2A-9.

As a general overview of the techniques described herein, an input to the image processing system 118 is first received that includes the target digital image 110 and a mask 202 indicating a portion of the image 110 that is to be processed, e.g., a hole to be fill, object to be removed, and so forth. The mask 202, for instance, may be configured as a binary image in which one value (e.g., "1") indicates pixels included as part of the portion (e.g., hole pixels) and another value (e.g., "0") indicates pixels that are to remain as part of the target digital image 110.

A plurality of candidate digital images 206 are then obtained from an image repository 126 by a candidate image collection module 204 based on the target digital image 110 (block 302) and mask 202. In another example, the plurality of candidate digital images 206 are specified manually via a user input. The candidate digital images 206 (e.g., from the image repository 126) serve as a basis to generate a transformation for application to the target digital image 110. The image repository 126 may be configured as a stock image database, a user's personal collection, a single image indicated by the user, and so forth. A user, for instance, may manually specify particular digital images (e.g., taken of a wedding) for use in processing a related image, e.g., to replace a background and so forth.

Figure 4:
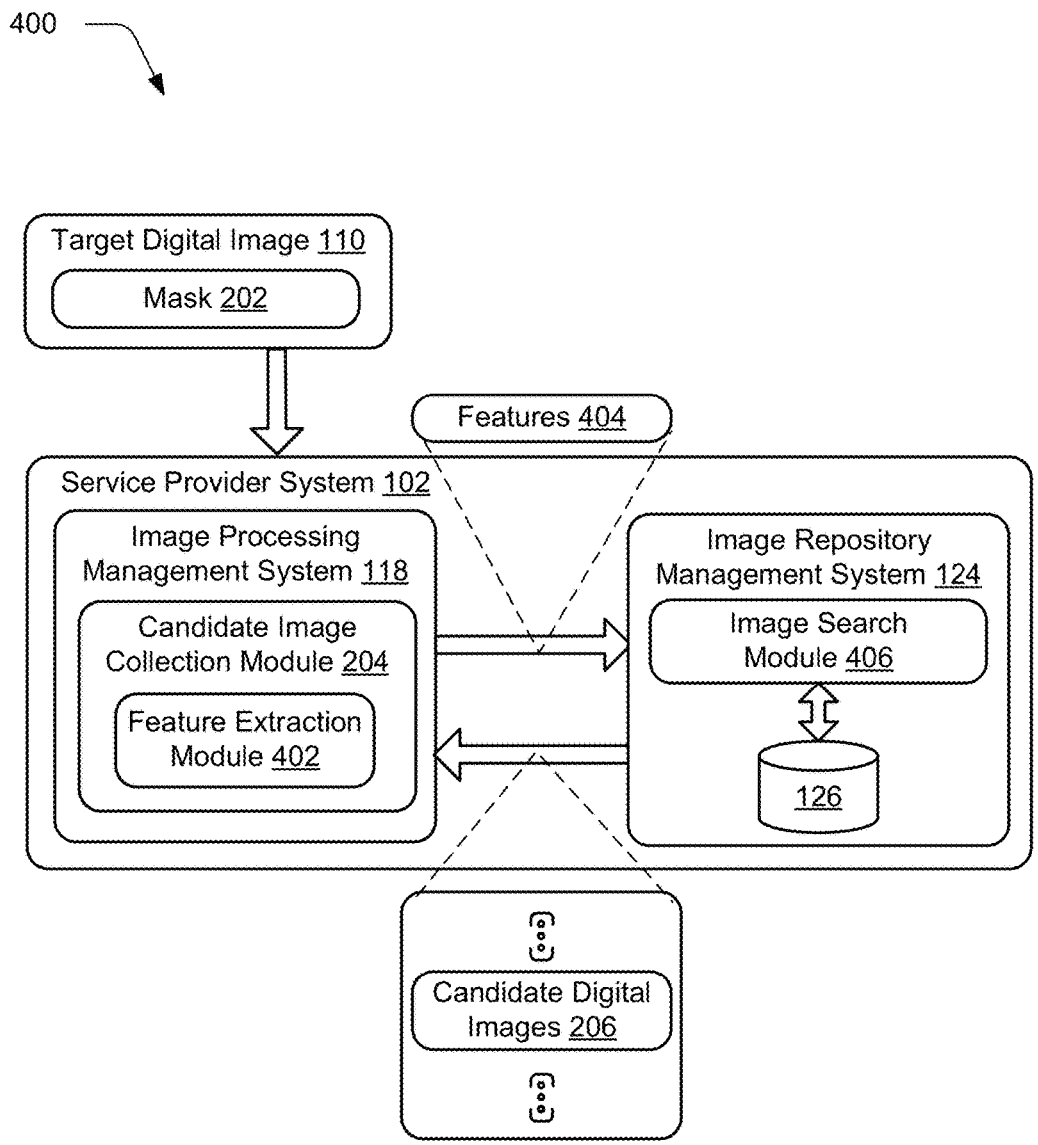
FIG. 4 depicts an example system showing operation of an image processing management system and image repository management system in greater detail as performing an image search.

As shown in greater detail in the example implementation 400 of FIG. 4, for instance, the target digital image 110 and mask 202 are received by a candidate image collection module 204. The candidate image collection module 204 is configured to first extend the mask 202 by a defined width (e.g., number of pixels) into the target digital image 110 to form a band image. A feature extraction module 402 is then employed to extract features 404 as a vector from the target digital image 110, e.g., using a machine learning module such as a trained neural network.

In another example, the mask 202 include a band image that includes a randomization of content (e.g., pixels, semantic labels, and so forth) that is usable to spur creative though. As a result, distinctive or arbitrary images may be created, such as to replace a house in an image with a rocket ship. Thus, the band image may provide a randomized guide to fill the hole, replace an object, and so forth in a variety of ways.

The features 404 are then communicated from the image processing management system 118 to the image repository management system 124. An image search module 406 is then employed to locate candidate digital images 206 in the image repository 126 based on the features 404 extracted from the target digital image 110. The image search module

406, for instance, may locate a predefined number (e.g., 200) of candidate digital images 206 that include features learned through machine learning that correspond to the feature 404 of the target digital image 110. The candidate digital images 206 are then provided back to the image processing management system 118 to act as a source for an image editing operation.

As previously described, a variety of different image editing operations may be performed that rely on a source, such as to replace or remove an object in a portion of the target digital image 110 as defined by the mask 202. In a "replacement" image editing operation (i.e., object replacement), features 404 are extracted directly from the target digital image 110. In a "removal" image editing operation (i.e., hole filling), a content-aware fill technique may be first employed by the candidate image collection module 204 to provide a preliminary fill to the portion, and the features 404 are extracted as a feature vector from the preliminarily filled target digital image 110.

A plurality of transformations are then generated to be applied to the target digital image 110. Each of the transformations is based on a respective candidate digital image 206 (block 304). The image processing system 118, for instance, is illustrated as including an image transformation module 208 that is implemented at least partially in hardware of a computing device. The image transformation module 208 is configured to generate transformations 210 based on each respective one of the plurality of candidate digital images 206.

Figure 5:
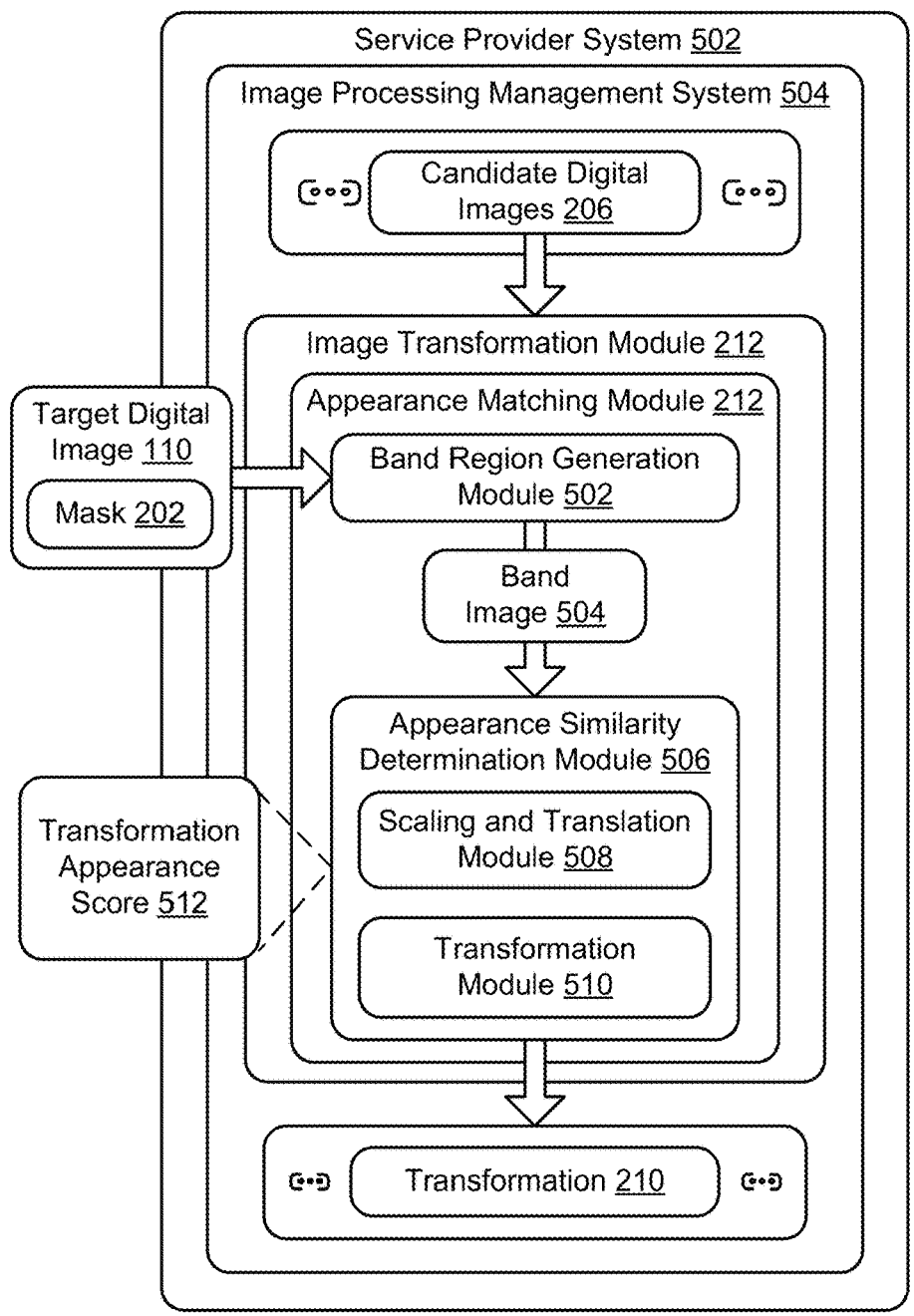
FIG. 5 depicts an example implementation in which operation of an image transformation module and appearance matching module is shown in greater detail.

FIG. 5 depicts an example implementation in which operation of the image transformation module and appearance matching module is shown in greater detail. The appearance matching module 212 includes a band region generation module 502 that is configured to extend the mask 202 into the target digital image 110 by a set width (e.g., number of pixels) to generate the band image 504.

The band image 504 is then used by an appearance similarity determination module 506 to calculate appearance similarity between the band image 504 and respective ones of the candidate digital images 206 to find an "image seam." An image seam describes a point that is used to align the portion of the band image with a portion of the candidate digital images 206, e.g., to align objects in the image, portions that do not include foreground objects but rather are limited to a background (e.g., sky and ground as shown in FIG. 1), and so forth. Further, this may be performed to combine transformations generated from multiple sources into a single transformation by finding seams for these transformations as a basis for alignment to each other.

The appearance similarity determination module 506 is configured to employ a variety of transformation techniques, examples of which include scaling and translation as represented by a scaling and translation module 508. In one example, the scaling and translation module 508 is configured to search in three scales (e.g., 1.0, 0.9 and 0.81) and in every valid offset. An offset is considered valid if usable to cause the candidate digital image 206 to completely cover the portion (e.g., hole) and the band image. To improve computational efficiency, a hierarchical search may be performed by the scaling and translation module 508 in which the target digital image 110 and candidate digital image 206 are down sampled to a lower resolution with the same scaling rate. A transformation is then located at this scale by a transformation module 510 from the respective candidate digital image 206 and transformed (e.g., up-sampled) back to the original resolution. A search may then performed in a local range of this transformation for refinement, i.e., to refine the transformation at the original resolution.

In order to locate the transformation, a transformation appearance score 512 is calculated by the appearance matching module 212 for each of the transformations 210 through the sum of squared distances. For a particular transformation "t," for instance, a transformation appearance score 512 may be calculated as follows:

$$s(t) = \sum_{p \in B} (\|I_t(p) - (tI_c)(p)\|_2 + \alpha \|\Delta I_t(p) - (t\Delta I_c)(p)\|_2)$$

In the above expression, "p" denotes a pixel location, and "B" is the band region data of the band image. The values "$I_t$" and "$I_c$" denote the target digital image 504 and candidate digital image 206 in Lab space, respectively. The values "$\Delta I_t$" and "$\Delta I_c$" describe a gradient of the gray-scale Lab target digital image 110 and candidate digital image 206, respectively. The value "$\alpha$" is a weight, which is set to 0.5 in an example implementation. The transformation appearance score 512 may thus be used to define which transformation generated based on a respective candidate digital image 206 is the "best." These transformations 210 are then output for each of the plurality of candidate digital images 206 for use in transforming the target digital image.

The transformations 210, in one example, are then filtered to remove semantically incorrect transformations (block 306). A semantic filtering module 214, for instance, may filter the transformations 210 based on semantic labels assigned to pixels of the transformations and target digital image 110 that describe "what" is represented by each of the pixels. In this way, the semantic filtering module 214 may identify and remove transformations that match well with the target digital image (e.g., based on the transformation appearance score 512) but are semantically incorrect, e.g., the sky is displayed beneath and surrounded by ground. This may be used to dramatically increase realism of the transformations 210 (e.g., realism in hole filling) as human users are visually sensitive to semantics.

Figure 6:
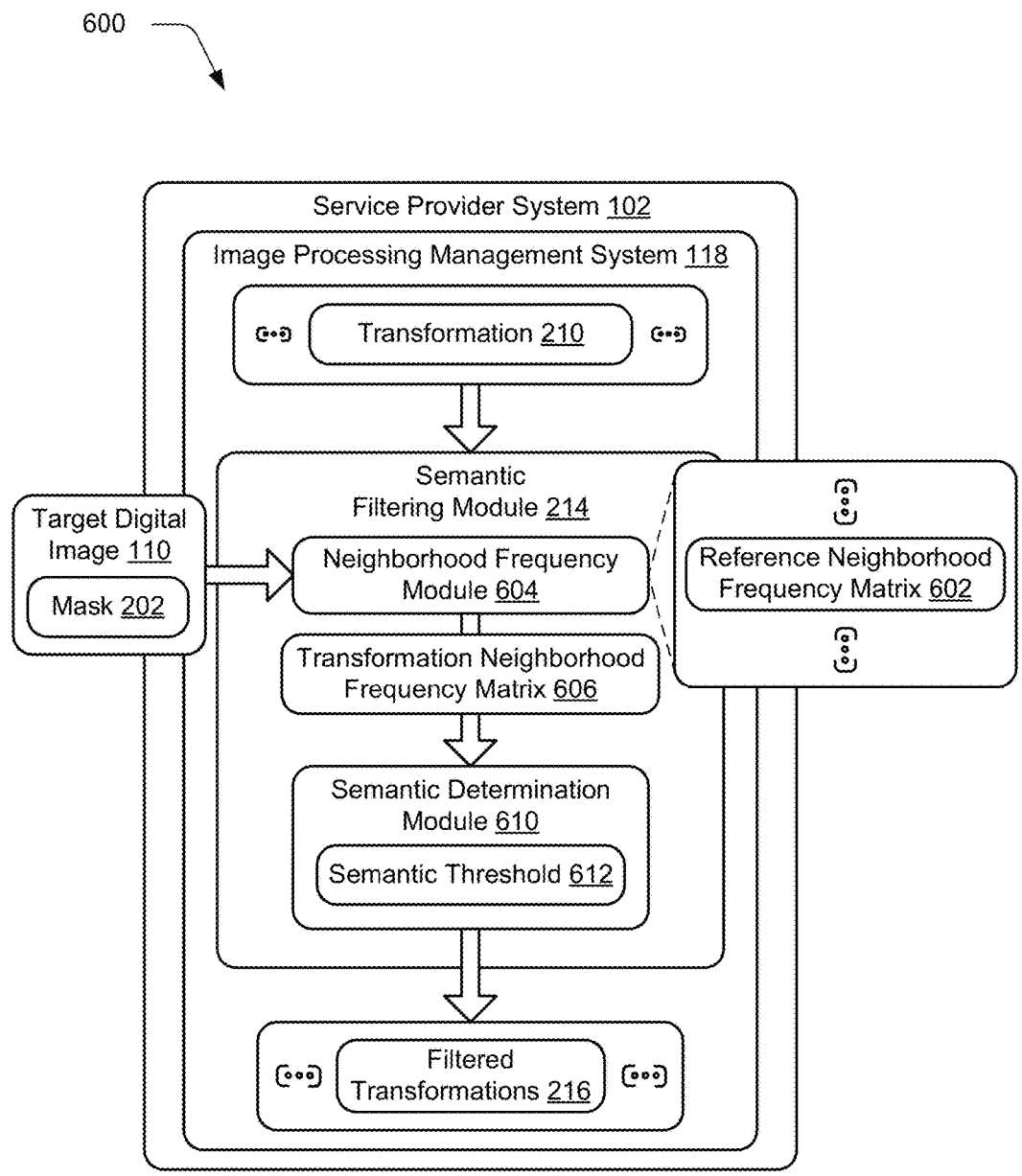
FIG. 6 depicts an example implementation showing operation of a semantic filtering module in greater detail as semantically filtering transformations to remove those that are semantically incorrect.

FIG. 6 depicts an example implementation 600 showing operation of the semantic filtering module 214 in greater detail as semantically filtering the transformations 210 to remove those that are semantically incorrect. In this example, a plurality of reference neighborhood frequency matrices 602 is first learned by a neighborhood frequency module 604 for training digital images that are semantically labeled, e.g., each pixel is assigned a semantic label. Each reference neighborhood frequency matrix 602 is generated using machine learning by the neighborhood frequency module 604 for pairs of semantic labels, e.g., house/sky 702, sidewalk/vehicle 704, sky/mountain 706, and table/basket 708 as shown in the example implementation of FIG. 7 along a boundary of a portion of the target digital image 110 and the transformation 210. A semantic threshold 606 is then calculated as a semantic incompatibility score to define whether the transformation 210 is considered semantically correct or incorrect.

For example, the neighborhood frequency module 604 may learn a 5×5 reference neighborhood frequency matrix 602 for each semantic label pair from a set of training digital images, i.e., first and second semantic labels. Each training digital image has semantic labels that associate a semantic type with each pixel. Accordingly, the reference neighborhood frequency matrix 602 describes frequency of another semantic label in the defined neighborhood.

The neighborhood frequency module 604, for instance, is configured to translate a first semantic label in a defined range (e.g., [−2,+2]*[−2,+2]) and a number of pixels is counted that overlap with a second semantic label for each offset at the respective pixels within the neighborhood. Thus, each reference neighborhood frequency matrix 606 describes frequency of pixels in a surrounding neighborhood that include the second semantic label in relation to the first semantic label defined at a center of the matrix. An example of this is illustrated using gradients between black (e.g., a target semantic label) and white (e.g., an anchor semantic label) in FIG. 7.

Figure 7:
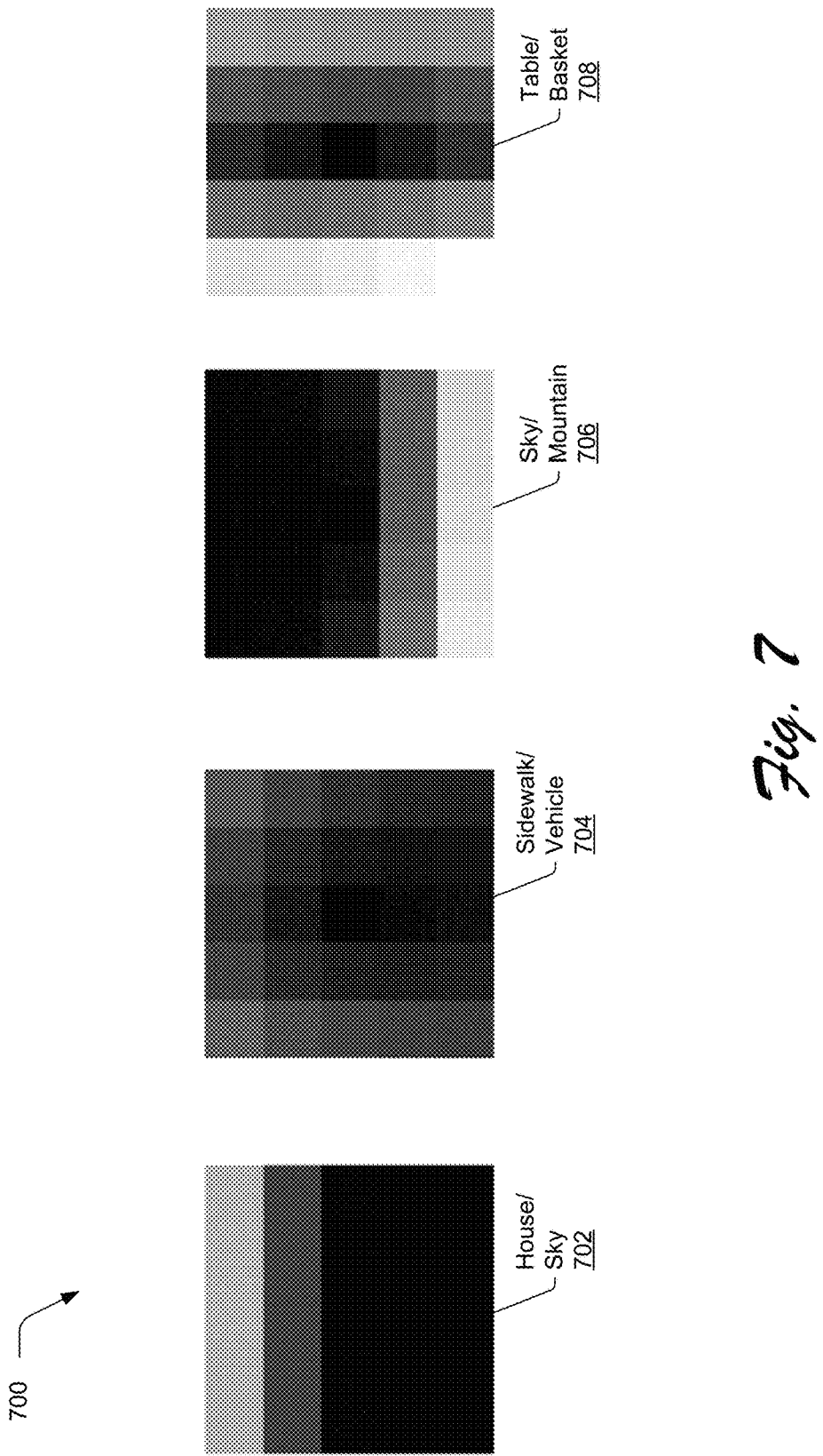
FIG. 7 depicts examples of neighborhood frequency matrices.

As a result, the reference neighborhood frequency matrix 602 is formed such that the center is zero and represents the first semantic label. The value in other places of the matrix represents the frequency of that offset for the first semantic label in relation to the second semantic label. The matrix is normalized to define each element of the matrix (e.g., pixel) in a range between [0,1] for each first/second semantic label pair. Likewise, a second/first semantic label pair may be used to generate another reference neighborhood frequency matrix 602 following a similar technique. The reference neighborhood frequency matrix 602 for each semantic label pair is then normalized by averaging occurrences in an entirety of the dataset. Examples of reference neighborhood frequency matrices are shown in FIG. 7 as previously described.

The neighborhood frequency module 604 is also configured to generate a transformation neighborhood frequency matrix 606 based on a respective one of the transformations 210 of the candidate digital images 206 and the target digital image 110. The transformations 210, for instance, may include semantic labels for pixels within the image based on the semantic labels of the candidate digital images. The target digital image 110 may also include semantic labels, which may be determined using a variety of techniques, e.g., a dilated network.

Each transformation 210 includes semantic labels as corresponding to a respective candidate digital image 206 and thus provides a semantic segmentation result. A semantic segmentation is also calculated of the target digital image 110 in this instance, by a semantic segmentation module 606. Accordingly, the neighborhood frequency module 604 may compute a transformation neighborhood frequency matrix 606 for each of the pixels that are disposed on a border between the transformation 210 and the target digital image 110 for semantic label pairs.

The transformation neighborhood frequency matrix 606 and respective reference neighborhood frequency matric 602 (e.g., for a matching semantic label pair) are then used by a semantic determination module 610 to determine if respective transformations 210 are considered semantically correct based on a semantic threshold 612. For each pixel on the boundary, the semantic labels are known as described above for each pixel and pixels within a defined neighborhood of the pixel. For each pixel that belongs to the [−2,2] neighborhood of the boundary pixel, a semantic incorrect value is set to one if its value in the neighborhood matrix is zero. Non-zero neighborhood matrix values are regarded as zero. A pixel's semantic incorrect value is set as one if there exist one zero value of a neighborhood matrix. From this, a semantic incorrect rate is determined by the semantic determination module 610 by calculating a percentage of pixels within the neighborhood that have been labeled as semantically incorrect. The rate is then compared to a semantic threshold 612 (e.g., 0.005) to determine whether a respective transformation is considered semantically correct or incorrect. Transformations that are indicated as semantically incorrect are removed, thus leaving a set of filtered transformations 216.

A plurality of transformed target digital images are then generated (block 308) using the transformations 210, whether filtered or not. Referring now to FIG. 2B, for instance, the filtered transformations 216 are then provided to an image transformation module 218. The image transformation module 218 is implemented at least partially in hardware of a computing device to align and blend the transformations 216 to the target digital images 110 based at least in part on semantic labels associated with the filtered transformation 216 and the target digital image 110.

Figure 8:
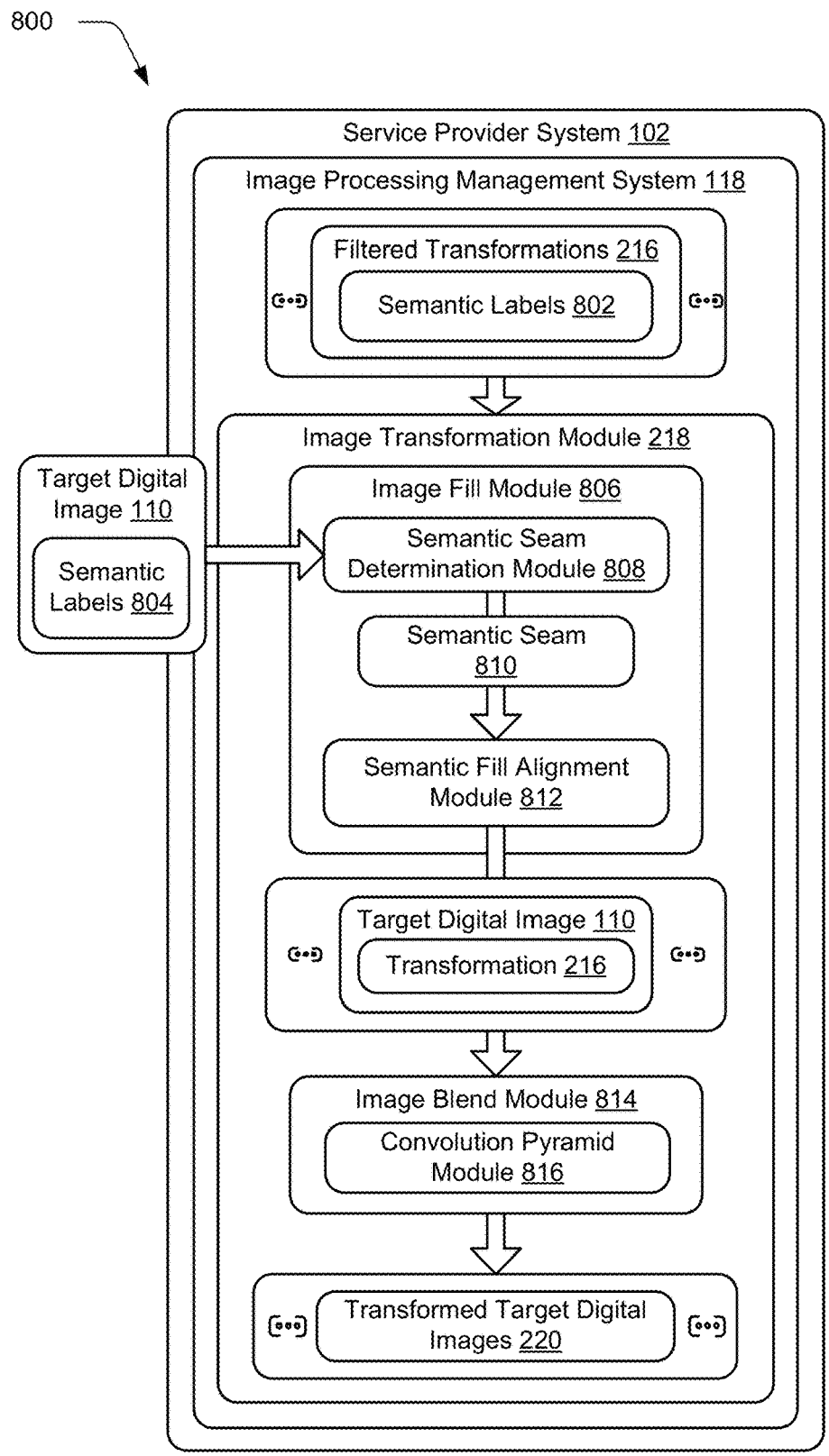
FIG. 8 depicts an example implementation in which operation of the image transformation module is shown in greater detail as performing a seam finding technique.

FIG. 8 depicts an example implementation 800 in which operation of the image transformation module 218 is shown in greater detail as performing a seam finding technique for alignment. As previously described, the filtered transformations 216 include semantic labels 802 and the target digital image 110 also includes semantic labels 804. These semantic labels 802, 804 are leveraged in this example to guide alignment of the filtered transformation 216 within the portion (e.g., hole) of the target digital image 110.

Figure 9:
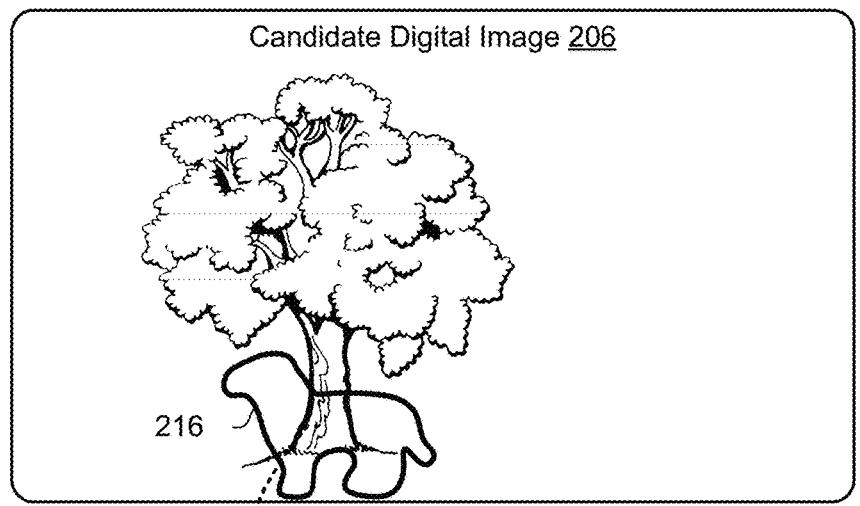
FIG. 9 depicts an example implementation of a seam finding technique.
Figure 9:
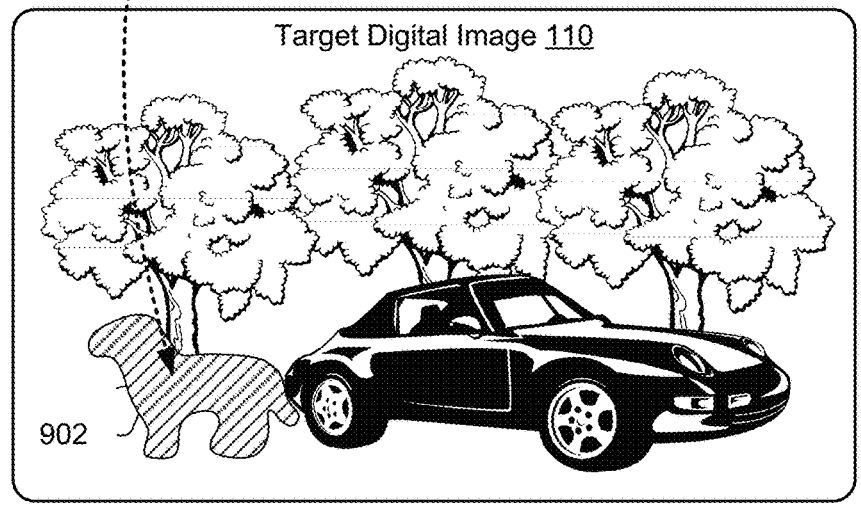

As shown in an example implementation of FIG. 9, for instance, a candidate digital image 206 is used as a source to generate a transformation 216 to fill a portion 902 (e.g., whole) of a target digital image 110. Semantic labels of the transformation 216 are then aligned to semantic labels the target digital image 110, e.g., the band image. In the illustrated example, this may be used to align a tree in transformation 216 with a tree in the target digital image 110, ground to ground, sky to sky, and so forth. As a result, the transformation 216 may provide enhanced realism over conventional techniques that are not capable of addressing complex structures.

In one example, the image transformation module 218 first employs an image fill module 806 that is configured to align the transformations 216 within a portion of the target digital image 110 based on respective semantic labels 802, 804. To do so, a semantic seam determination module 808 is used to locate a semantic seam 810 based on the semantic labels 802, 804 that is used to align similar semantic labels to each other, such as to follow an edge of a tree in the example of FIG. 9. In one example, a graph cut image segmentation approach is utilized by the semantic seam determination module 808 to minimize a following labelling function:

$$E(f) = \sum_{p \in P} D_p(f_p) + \lambda \sum_{p,q \in N} V_{p,q}(f_p, f_q)$$

Here, "f" is a labeling function for two labels, a target and candidate label. The first term is used to define appropriateness of a semantic label for a pixel "p".

In an implementation, higher weights (e.g., 10000) are defined for the pixels outside the band image, while the weights of pixels that have the candidate label is zero. For the pixels of object that reside entirely within the portion of the target digital image 110 (e.g., the filled transformations 216), candidate weights are set to 1000, and target weights to zero. For pixels includes as part of objects that are both inside and outside the band image, the highest weights (e.g., 20000) are used if having a target semantic label, and zero if having the candidate semantic label. For pixels of objects that reside in both the band region and the portion (e.g., the hole), the highest weights (e.g., 20000) are used if having a candidate semantic label, and zero if includes a target semantic label. For other pixels in the band region, weights of a target semantic label vary smoothly in [0,1000] according to a distance ratio to the outer boundary and inner boundary of the band image. The weights of candidate semantic labels are defined in the same way in [0,1000]. A smoothing term is calculated as a sum of squared distance in color space (RGB) for each pixel pair, and the weight "λ" is set to 150 in an example implementation.

Once the semantic seam 810 is found by minimizing the labelling function, a semantic fill alignment module 812 is employed to align the transformation 216 within the portion of the target digital image 110 based on the semantic seam 810. This results in an output of each of the transformations 216 as applied to the target digital image 110 as illustrated.

An image blend module 814 is also employed to blend the transformation 216 as part of the target digital image 110. This technique also employs semantic labels to promote realism, such as to permit blending of parts of the ground to each other and the sky to each other but not the sky and ground together. A variety of techniques may be employed to perform the blending, such as a convolution pyramid technique, which is a fast approximation of a mean value coordinate blending technique. In this way, a plurality of the transformed target digital images 220 are formed that have increased realism by leveraging semantic labels, which are then output (block 310), e.g., for display in a user interface stored in storage, and so forth.

In one example, output of the transformed target digital images 220 is configured based on an image ranking module 222 that generates image ranking scores indicative of an amount of realism exhibited by respective transformed target digital images 220. In this way, a user may be efficiently exposed to these images in an intuitive manner as further described in the following section.

Image Realism Ranking

Figure 10:
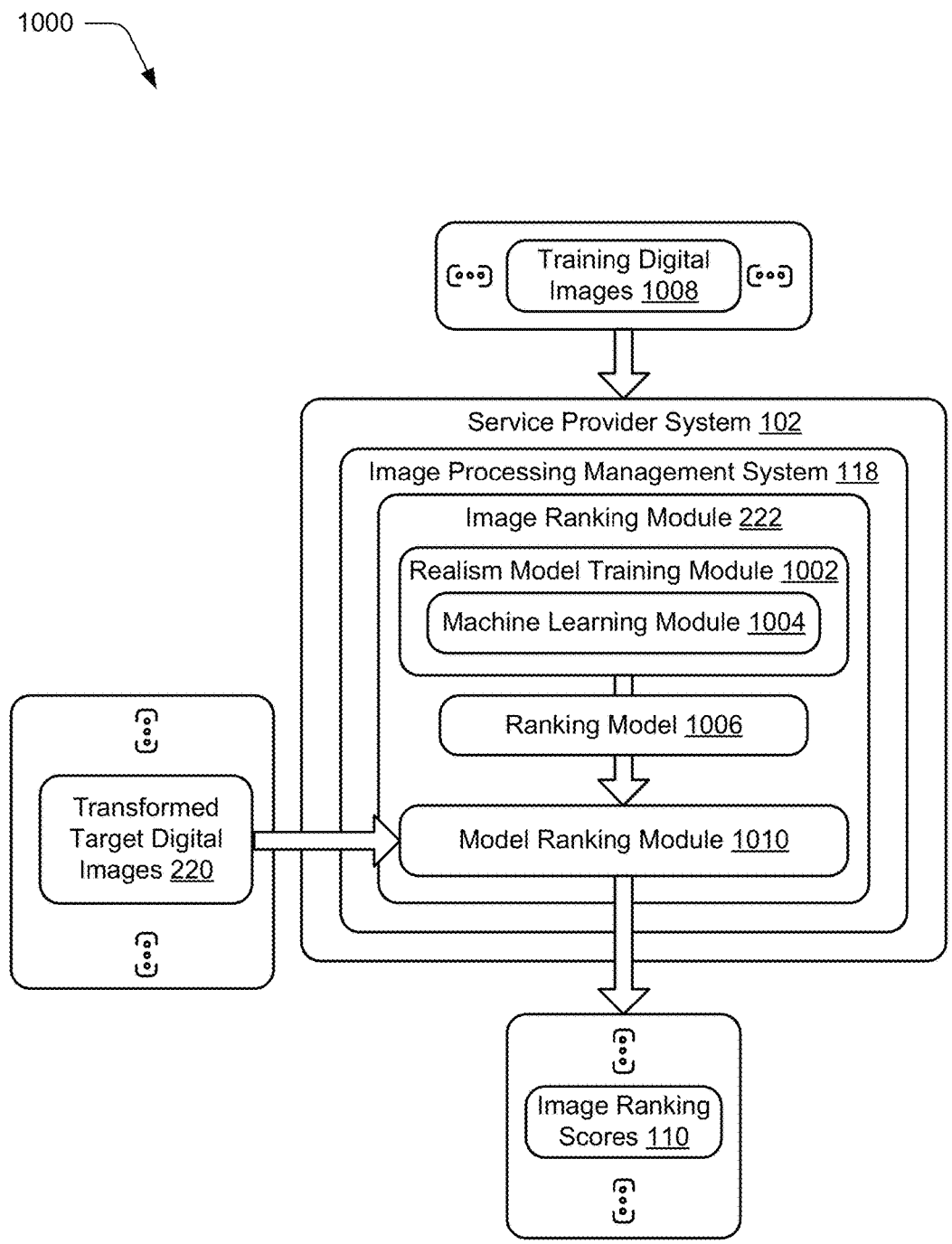
FIG. 10 depicts a system in an example implementation in which operation of an image ranking module of FIG. 2B is shown in greater detail.
Figure 11:
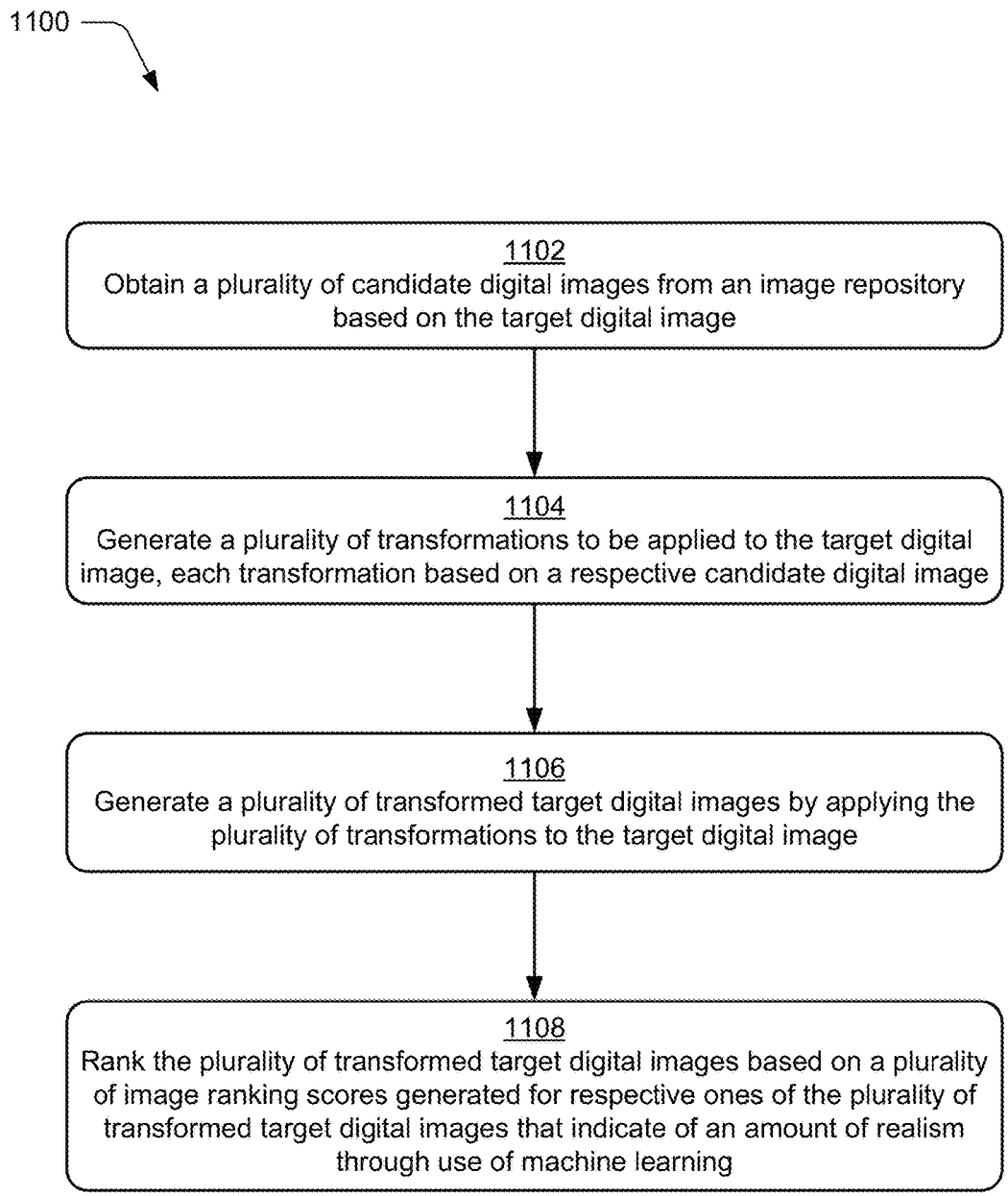
FIG. 11 depicts a procedure in an example implementation in which image ranking scores are generated for respective images.

FIG. 10 depicts a system 1000 in an example implementation in which operation of the image ranking module 222 of FIG. 2B is shown in greater detail. FIG. 11 depicts a procedure 1100 in an example implementation in which image ranking scores are generated for respective images.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 10-11.

The service provider system 102 in this instance includes an image ranking module 222 that is configured to employ machine learning to generate image ranking scores 110. The image ranking scores 110 describe an amount of realism and/or lack of realism in a target digital image, such as the transformed target digital images 220 previously described. To do so, the image ranking module 222 includes a realism model training module 1002 having a machine learning module 1104 configured as a neural network to generate a ranking model 1106.

To generate the ranking model 1006, the realism model training module 1002 employs a plurality of training digital images 1008, e.g., from an image repository 126 of FIG. 1. In one example, the training digital images 1008 are examples of digital images that exhibit realism, e.g., realistic relations between objects within the digital image, colors and relationships between the colors, textures, and so forth. The training digital images 1008, for instance, may have associated scores that indicate an amount of realism, e.g., to support supervised or semi-supervised machine learning based on user inputs. Therefore, the ranking model 1006 in such an instance is configured to classify an amount of realism as part of the image ranking scores 110 based on these training digital images 1008 and associated scores.

In another example, the training digital images 1008 are examples of digital images that lack realism, e.g., based on relationships between objects within the digital image, and so forth that are not found in real life or considered unrealistic by users that manually scored the images. Thus, in this example the ranking model 1006 is configured to classify images as exhibiting a lack of realism, e.g., through supervised, unsupervised, or semi-supervised machine learning. Of note, detection of a lack of realism does not necessarily result in detection of the opposite condition (e.g., realism) and vice versa. For example, detection of one condition does not presuppose detection of the opposite condition, i.e., realistic versus unrealistic relationships of objects within the image. Thus, in one instance the image ranking scores 110 are used from both types of models and aggregated to achieve a final image ranking score 110 for a particular target digital image.

The ranking model 1006 is then provided as an input to a model ranking module 1010 that is configured to generate image ranking scores 110 based on an input target digital image. This may be used to support a variety of functionality, such as to rank image search results based on realism, to learn when a realistic image processing result has been achieved, and so forth.

Continuing the example of FIG. 2B, for instance, the ranking model 1006 may be employed by the model ranking module 1010 to generate image ranking scores 110 for each of the plurality of transformed target digital images 220. In this way, the image ranking scores 110 may be used to output transformed target digital images 220 that appear realistic and remove those that do not. For instance, as before a plurality of candidate digital images are obtained from an image repository based on the target digital image (block 1102). A plurality of transformations are then generated to be applied to the target digital image, each transformation based on a respective candidate digital image (block 1104) as previously described.

After application of the transformations to form the plurality of transformed target digital images 220, the model ranking module 1010 accepts these images as an input (block 1106). The plurality of transformed target digital images 220 are then ranked by the model ranking module 1010 using a plurality of image ranking scores 110 for respective ones of the plurality of transformed target digital images 220 that indicate an amount of realism (block 1108). The image ranking scores 110, for instance, may be compared in relation to a threshold by the model ranking module 1010 that indicates a minimal amount of realism that is desired or lack of realism that is permitted by the transformed target digital images 220. Additionally, a mask may be employed to specify a portion of the transformed target digital images 220 that is subject of the transformation and thus act as a hint to guide use of the ranking model 1106 by the model ranking module 1010 to verify realism or a lack thereof. Other examples of provision of a search context (e.g., the mask) through use of search context data are described in relation to FIGS. 14-16.

Refinement Layer

Figure 12:
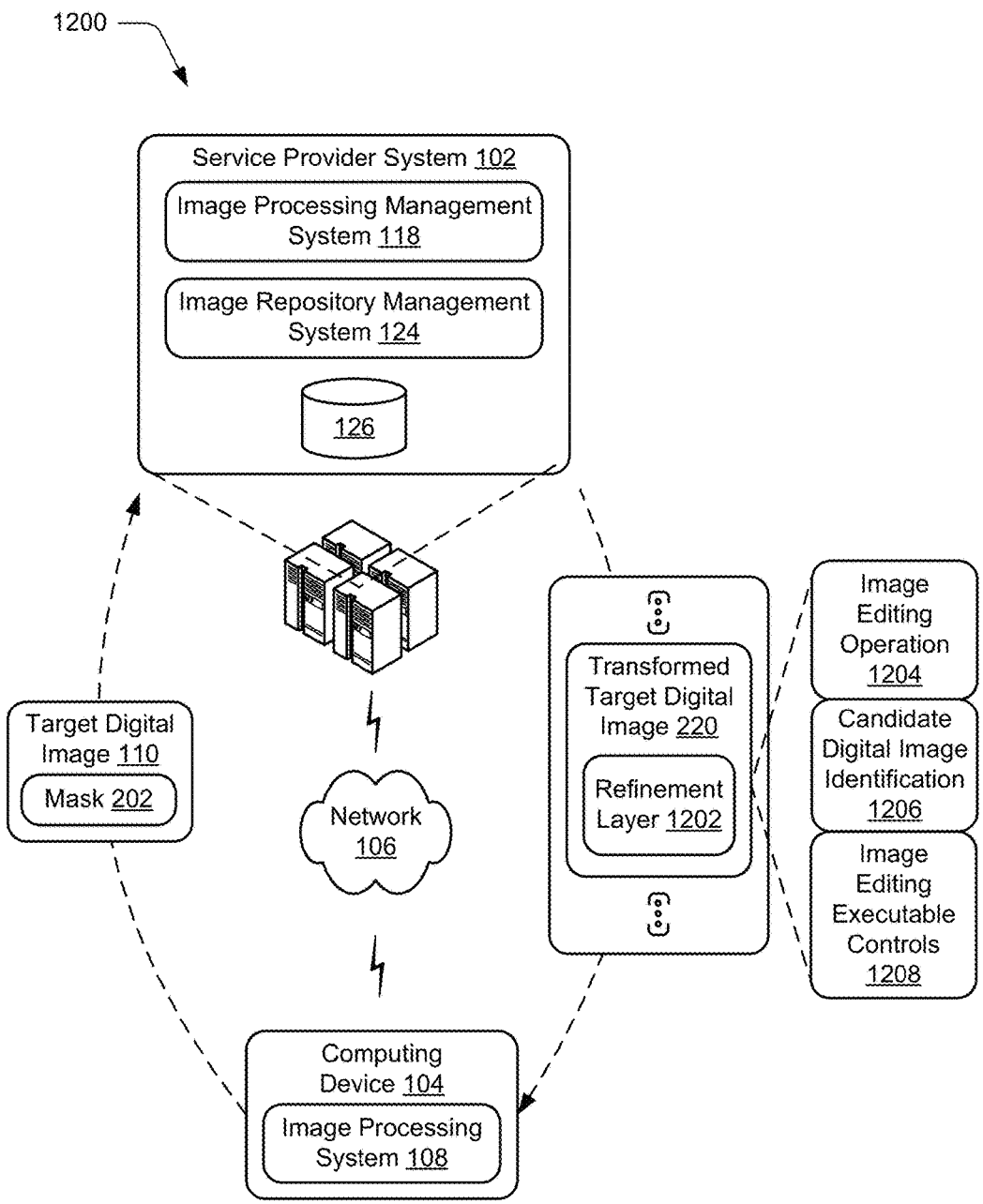
FIG. 12 depicts a system in an example implementation in which an image processing result includes a refinement layer that is adjustable to change how the image processing result was achieved for a target digital image.
Figure 13:
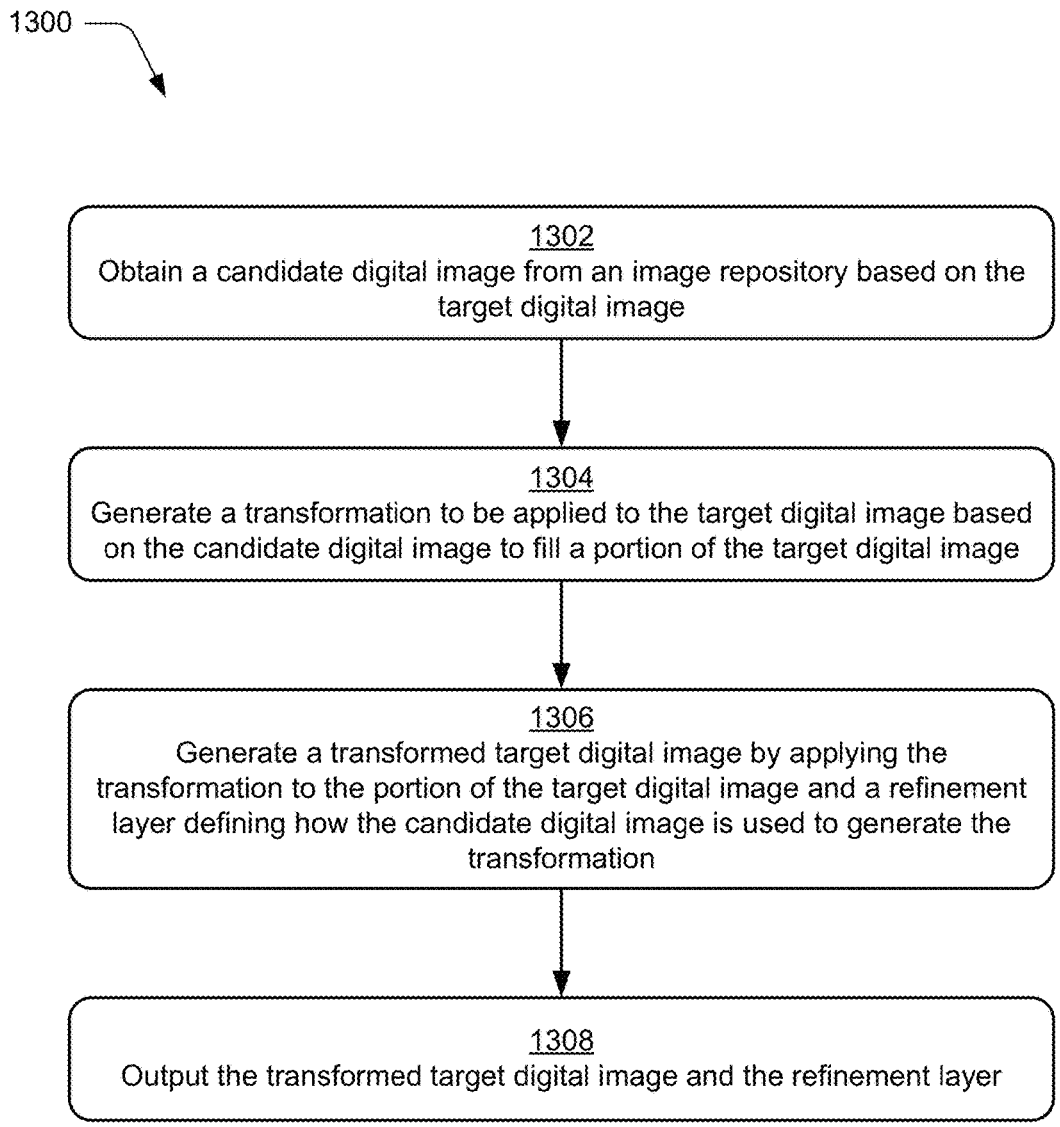
FIG. 13 depicts a procedure in an example implementation in which a transformed target digital image and refinement layer are generated and output by a computing device.

FIG. 12 depicts a system 1200 in an example implementation in which an image processing result includes a refinement layer that is adjustable to change how the image processing result was achieved for a target digital image. FIG. 13 depicts a procedure 1300 in an example implementation in which a transformed target digital image and refinement layer are generated and output by a computing device.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 12-13.

Convention image processing results are provided in a "completed" form that is ready for rendering. Although this provides an efficient way in which to store and render the result, these results then lack the "how" the image processing was achieved. Therefore, changes to the result require conventional systems to start again at the beginning, which is inefficient and frustrating. Accordingly, techniques are described in this section in which a refinement layer is used to permit further refinement to an image processing result (e.g., a transformed target digital image) without requiring a user to start over using a finished digital image.

In one example, a target digital image 110 is received by an image processing management system 118 that is to be a subject of an image processing technique, e.g., hole filling, object removal, and so forth. The image repository management system 124 is then employed to obtain a candidate digital image from an image repository 126 based on the target digital image (block 1302). Like before, a transformation is generated to be applied to the target digital image 110 based on the candidate digital image (block 1304), e.g., to fill a portion of the target digital image as acting as part of a source. Other examples of image processing techniques are also contemplated that do not involve a source, e.g., through use of filters.

A transformed target digital image 220 is then generated by applying the transformation to the portion of the target digital image. As part of this, a refinement layer 1220 is also generated that defines how the candidate digital image is used to generate the transformation (block 1306), e.g., fill the hole, replace content or otherwise transform the digital image through image editing operations. The refinement layer 1202 includes data that describes how the target digital information 110 is processed using image editing functionality to form the transformed target digital image 220. This includes data describing an image editing operation 1202 (e.g., hole filling, object removal and replacement, etc.), settings used as part of performance of the operation, and so on.

For example, one parameter that may be adjusted through use of the refinement layer 1202 is the mask or "seam" between the target and candidate digital images. The seam between the target and candidate digital images may be represented as a mask, which is user adjustable through use of a user interface control (e.g., a brush) to modify a size or shape of the mask. Other examples are also contemplated.

In instances in which the image repository 126 is also utilized, a candidate digital image identification 1206 may also be included that is usable to obtain the candidate digital image from the image repository 124. This may also include the candidate digital image itself and/or functionality selectable (e.g., a hyperlink) to license or purchase rights to use of the image as further described in relation to FIGS. 15-16, e.g., in a stock image scenario through interaction with an image repository management system 124.

Image editing executable controls 1208 may also be included as part of the refinement layer 1202. These controls may be implemented to support user interaction in a variety of ways (e.g., sliders, dials, set values, and so forth) to adjust parameters used as part of the image editing operation 1204 to form the transformation. A variety of other examples are also contemplated in which the refinement layer 1202 is used to adjust, further refine, and even partially remove an effect of a transformation as applied to the target digital image 110. The transformed target digital image and refinement layer are then output (block 1308), e.g., communicated via the network 106, stored in storage 112 of a computing device 104, and so forth. In this way, the refinement layer may be used to refine image processing techniques performed on a target digital image without requiring the user to "start over" as in conventional techniques.

Search Context Data and Digital Rights Management

Figure 14:
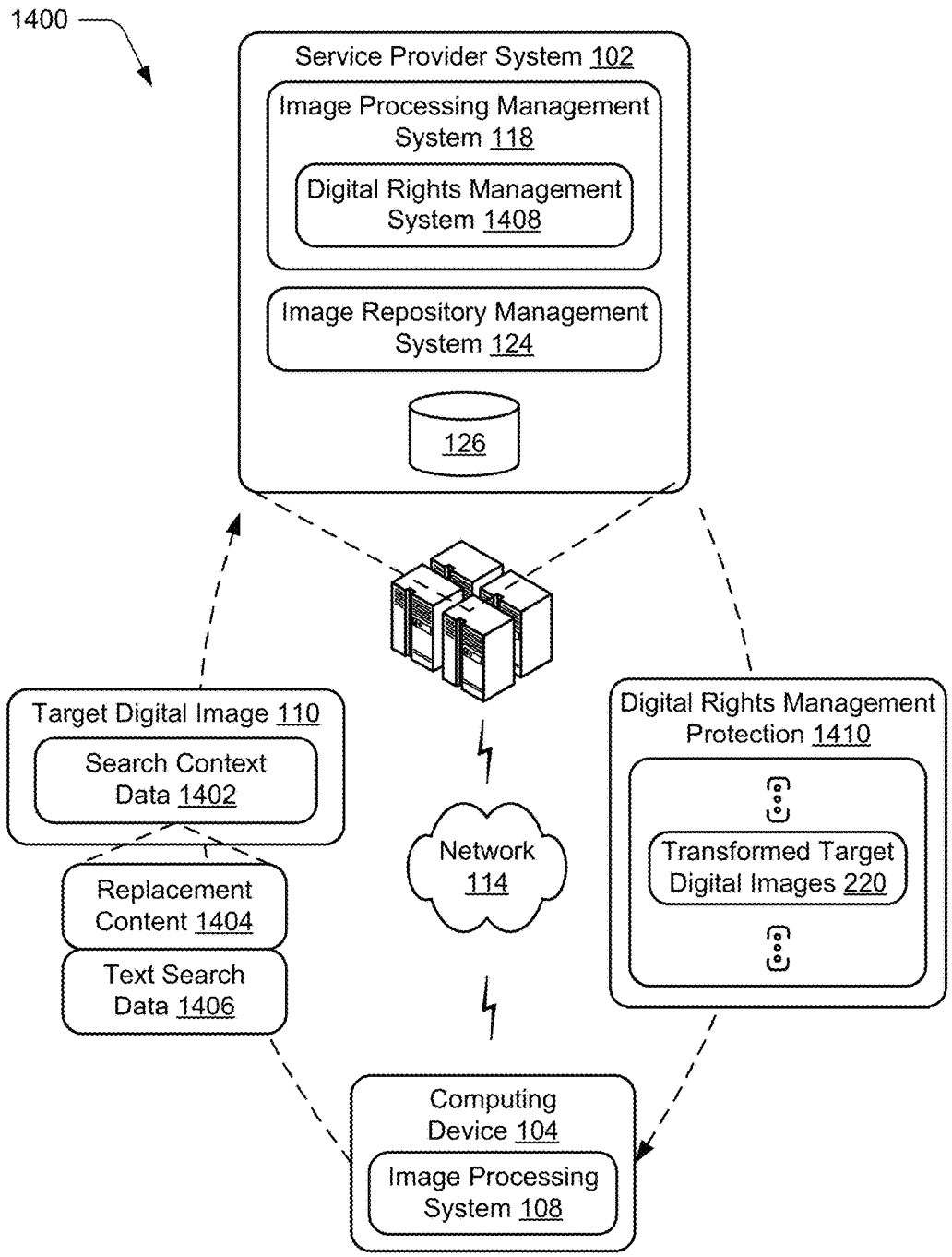
FIG. 14 depicts a system in an example implementation in which search context data is provided along with a target digital image to guide a search of an image repository to locate a candidate digital image that is used as a source for image processing.
Figure 15:
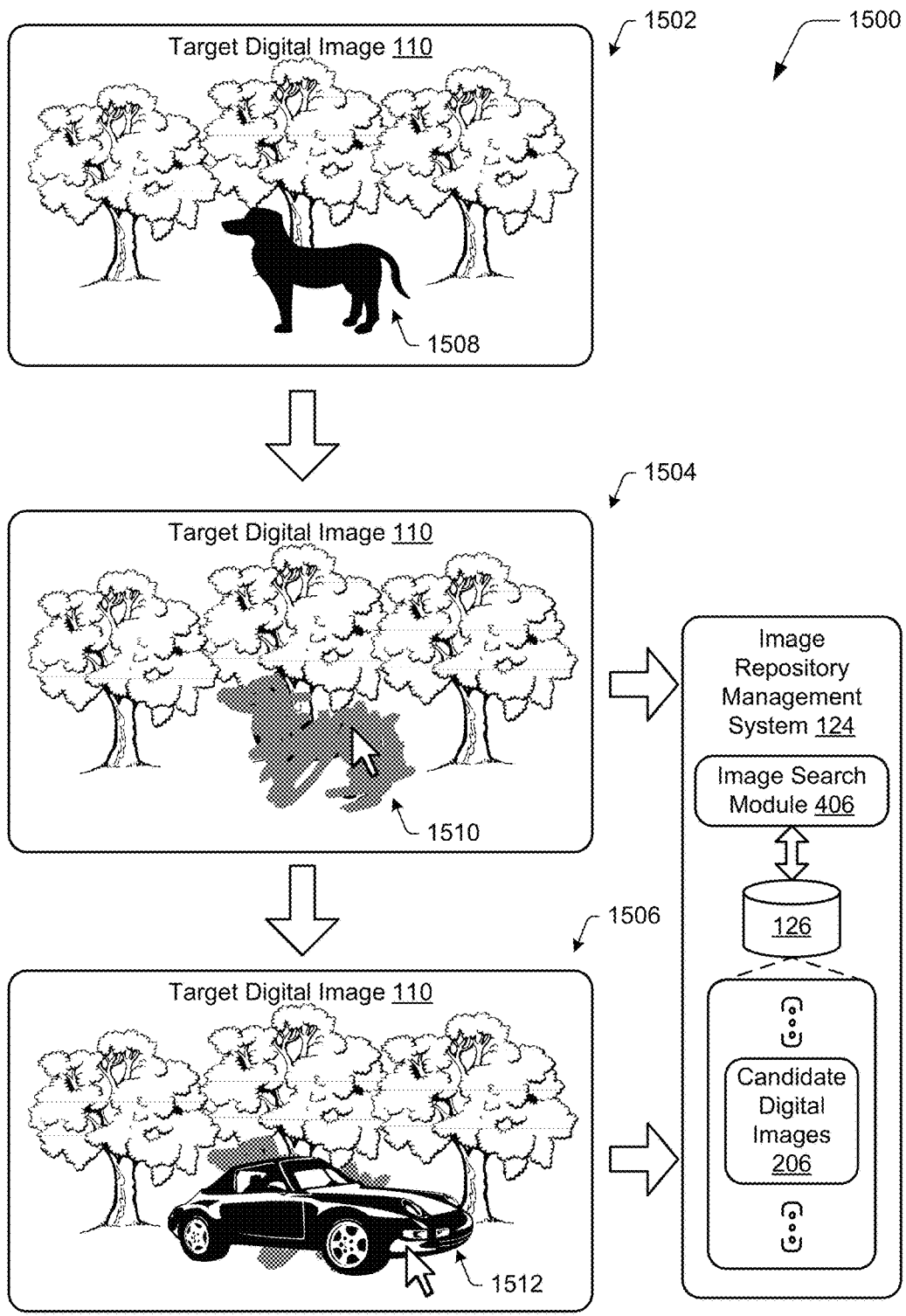
FIG. 15 depicts a system in an example implementation showing examples of search context data including removal and replacement content.
Figure 16:
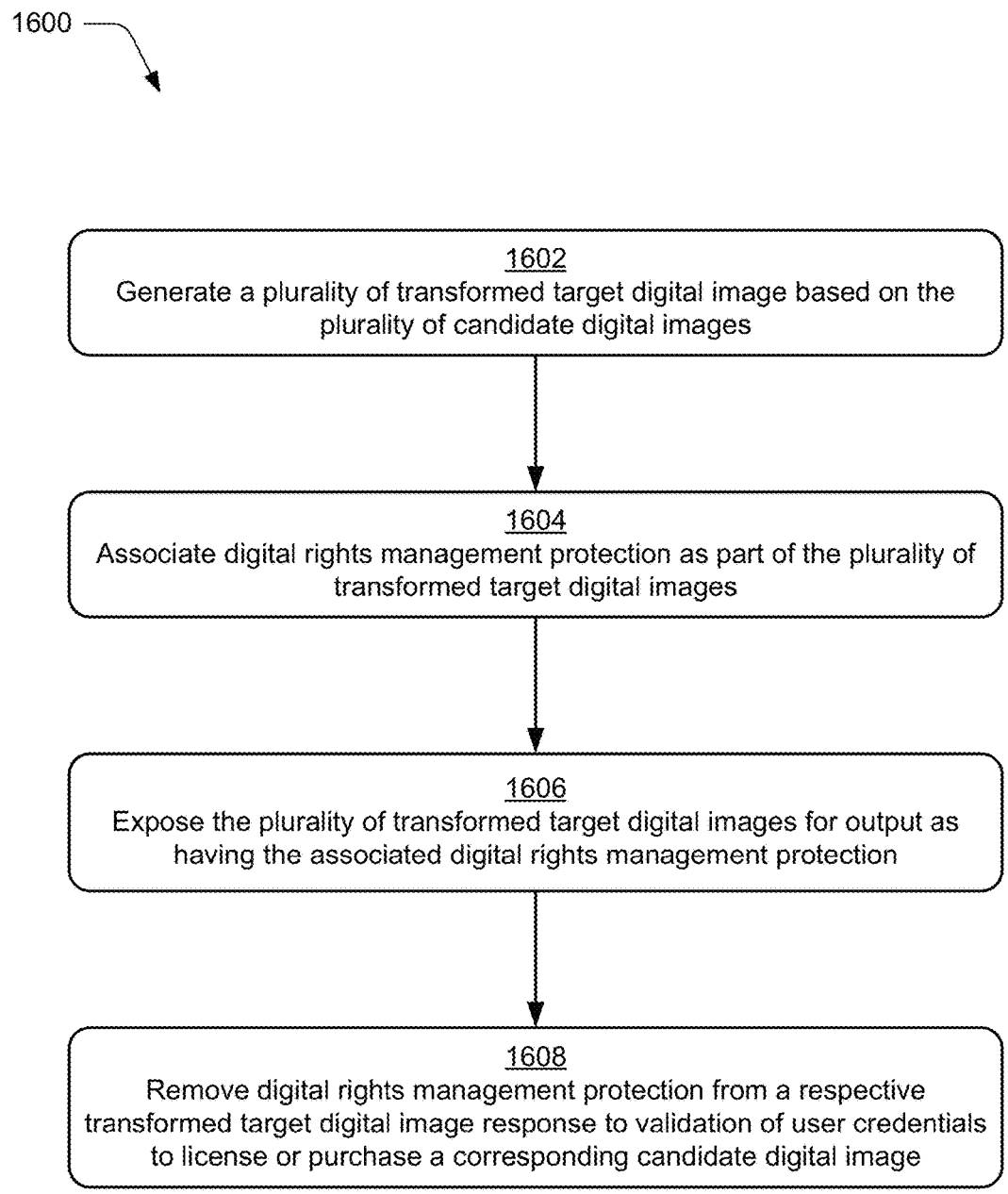
FIG. 16 depicts a procedure in an example implementation in which search context data is used to guide a search of an image repository.

FIG. 14 depicts a system 1400 in an example implementation in which search context data 1402 is provided along with a target digital image 110 to guide a search of an image repository to locate a candidate digital image that is used as a source for image processing. FIG. 15 depicts a system 1500 in an example implementation showing examples of search context data including removal and replacement content. FIG. 16 depicts a procedure 1600 in an example implementation in which search context data is used to guide a search of an image repository.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 14-16.

As previously described, some image processing techniques rely on a source that defines how a transformation that is to be applied. Therefore accuracy of the source has a direct effect on the accuracy of the transformation that is generated based on the source. Accordingly, techniques are described herein in which search content data 1402 is provided along with a target digital image 110 to refine an image search performed by an image repository management system 124 through an image repository 126 for candidate digital images that are used as a source to generation a transformation of the target digital image 110.

The search context data 1402 may take a variety of forms. In one example, replacement content 1404 is used to remove an effect of an object within the image on a search or replace the object with a different desired object that is to be part of the transformation (e.g., the fill of the hole) in the target digital image 110. As shown in the example implementation 1500 of FIG. 15, for instance, a user may interact with a user interface output by the image processing system 108 of the computing device 104. This interaction is illustrated using first, second, and third stages 1502, 1504, 1506.

At the first stage 1502, the user interface includes a display of the target digital image 110 and an object 1508 that is to be removed, e.g., a dog. At the second stage 1504, user inputs 1510 are received to "cross out" or otherwise obscure (e.g., mask out) the dog 1510 that is to be removed from the target digital image 110. The target digital image 110, having the user input applied, is then used by an image search module 406 of the image repository management system 124 to search candidate digital images 206 with an effect of inclusion of the object 1508 being lessened and even potentially removed from the image search. Thus, the candidate digital images 206 that are returned as a result of the image search have a decreased likelihood of inclusion of the unwanted object 1508, thus improving accuracy of image processing techniques that leverage these images as a source of a transformation.

Replacement of the object may also be used to guide the search. As shown at the third stage 1506, for instance, another object 1512 is placed within the target digital image 110 that is to be used to guide the image search result toward a desired result, e.g., inclusion of a car to replace the object 1508 of the dog. Therefore, the target digital image 110, having the replacement, may be employed by the image search module 406 to guide a search for similar candidate digital images 206 that also include the other object 1512, e.g., the car. Thus, the candidate digital images 206 that are returned as a result of the image search have an increased likelihood of inclusion of the desired object 1512, thus improving accuracy of image processing techniques that leverage these images as a source of a transformation.

In another example, the search context data 1402 includes text search data 1406 that is used to guide the image search. The target digital image 110, for instance, may include text search data 1406 (e.g., "car") that is the used by the image repository management system 124 to search candidate digital images 206 based both on the target digital image 110 and the text. In this way, the search context data 1402 may be used to improve accuracy of a source used to perform an image processing technique and thus accuracy of the technique itself. A variety of other examples of search context data 1402 are also contemplated, such as use of an initial transformation to guide accuracy in an subsequent transformation.

As previously described, multiple transformed target digital images 220 may be generated based on a variety of different candidate digital images 206. A user, however, may not wish to license or otherwise obtain each of the different candidate digital images 206 in order to view an effect of a transformation generated from the images. Accordingly, in this example a digital rights management system 1408 is employed to provide digital rights management protection 1410 (e.g., down sampling, a watermark, and so forth) to the transformed target digital images 220. As a result, a user may view the transformed target digital images 220 as having this protection to select one or more of the images of interest. The digital rights management protection 1410 is then removed (e.g., as a result of licensing or purchase of the images) from the images of interest, thereby promoting use of the image repository 126 and protection of creative professionals.

In one example, a plurality of transformed target digital images 220 are generated based at least in part on a plurality of candidate digital images 206 (block 1602) as before. Digital rights management protect is then associated as part of the plurality of transformed target digital images (block 1604), e.g., through use of a watermark, down sampling, and so forth. The plurality of transformed target digital images are then exposed for output as having the associated digital rights management protection (block 1606), e.g., communicated from the service provider system 102 to the computing device 104 for viewing via a user interface.

A user may then view these images in a user interface and select one or more transformed digital images as desired. As part of this selection, a user purchases a license to use the candidate digital image in order to generate the transformation, e.g., through validation and verification of user credentials, as part of a subscription based service, and so forth. In response, digital rights management functionality may be removed from the transformed target digital image (block 1608). In this way, a user may view a result of the transformations and purchase rights when desired in an efficient and cost effective manner without requiring purchase of rights to candidate digital images that are not desired by the user in order to serve as a source of the transformation.

Example System and Device

Figure 17:
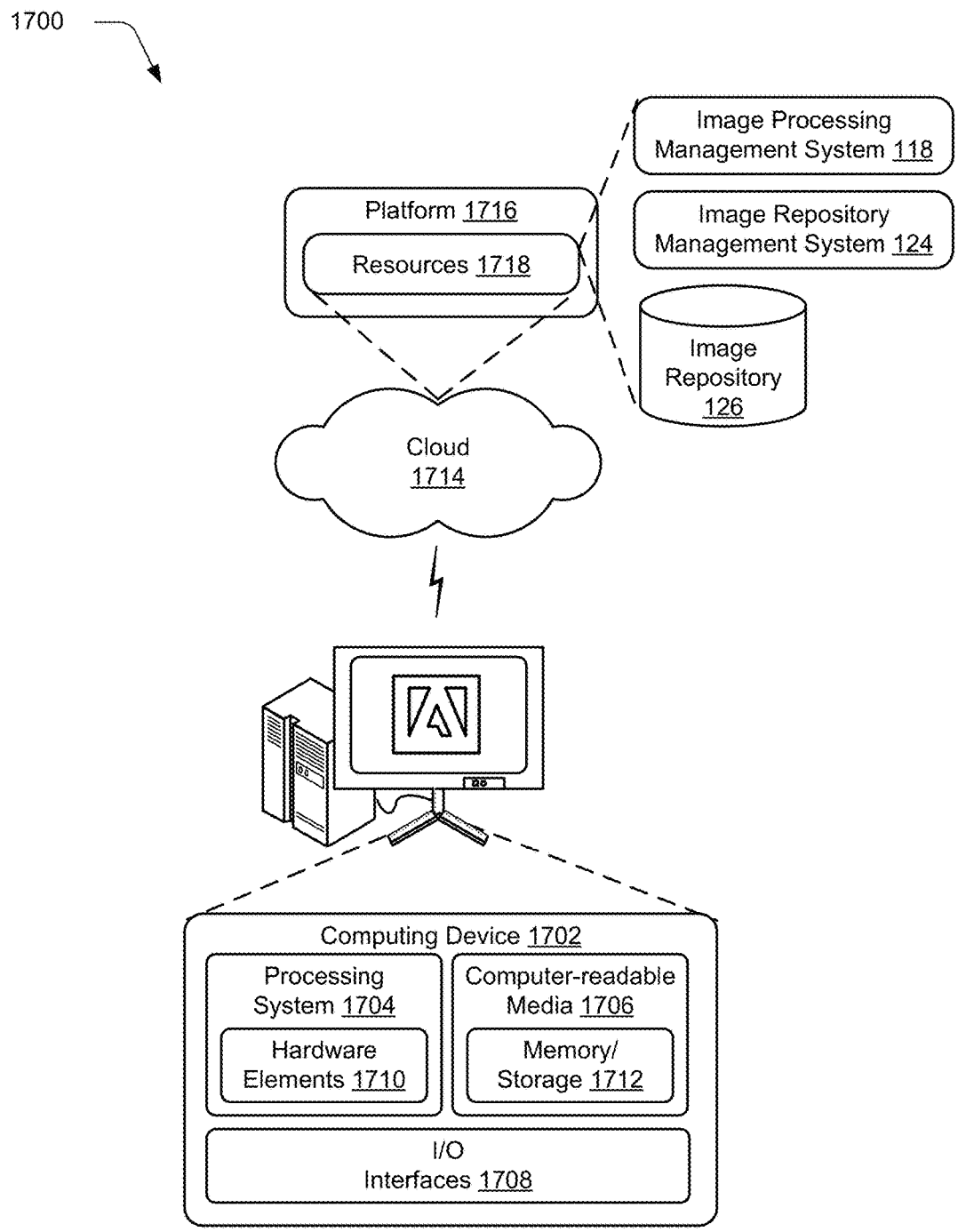
FIG. 17 illustrates an example system including various components of an example device that can be implemented as any type of computing device as described and/or utilize with reference to FIGS. 1-16 to implement embodiments of the techniques described herein.

FIG. 17 illustrates an example system generally at 1700 that includes an example computing device 1702 that is representative of one or more computing systems and/or devices that may implement the various techniques described herein. This is illustrated through inclusion of the image processing management system 118, image repository management system 124, and image repository 126. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interface 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware element 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 may include applications and/or data that can be utilized while computer processing is executed on servers that are remote from the computing device 1702. Resources 1718 can also include services provided over the Internet and/or through a subscriber network, such as a cellular or Wi-Fi network.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to transform a target digital image using image processing, a method implemented by at least one computing device, the method comprising:
   searching, using search context data relating to the target digital image, through multiple different digital images stored in an image repository;
   obtaining, by the at least one computing device, a candidate digital image from the multiple different digital images stored in the image repository based on determining that the candidate digital image corresponds to the search context data relating to the target digital image;
   generating, by the at least one computing device, a visual transformation to be applied to a portion of the target digital image based on the candidate digital image;
   generating, by the at least one computing device, a transformed target digital image by applying the visual transformation to the portion of the target image and a refinement layer defining how the candidate digital image is used to generate the visual transformation; and
   visually outputting, by the at least one computing device, the transformed target digital image and the refinement layer.

2. The method as described in claim 1, wherein the refinement layer includes at least one control that is user manipulable to adjust an effect of an operation used as part of the generating the transformation based on the candidate digital image.

3. The method as described in claim 1, wherein the visually outputting includes the candidate digital image.

4. The method as described in claim 3, wherein:
   the candidate digital image is made available for purchase or licensing via the image repository;
   the transformed target digital image and the candidate digital image are protected using digital rights management and include an option that is selectable to remove the protection upon the licensing or purchase.

5. The method as described in claim 4, wherein the transformed target digital image is included as one of a plurality of transformed target digital images that are output to a provider of the target digital image as available for licensing or purchase.

6. The method as described in claim 5, further comprising:
   receiving, by the at least one computing device, credential data usable to purchase rights to license or purchase a particular said transformed target digital image; and
   responsive to validation of the credential data, removing the digital rights management from the particular said transformed target digital image by the at least one computing device.

7. The method as described in claim 6, further comprising responsive to validation of the credential data, removing the digital rights management from a particular said candidate digital image that corresponds to the particular said transformed target digital image by the at least one computing device.

8. The method as described in claim 1, wherein the transformed target digital image is included as one of a plurality of transformed target digital images, the method further comprising:
   generating a plurality of image ranking scores through use of machine learning for respective ones of the plurality of transformed target digital images that is indicative of an amount of realism; and
   ranking the plurality of transformed target digital images based on the plurality of image ranking scores.

9. The method as described in claim 8, wherein:
   a plurality of said candidate digital images is made available for purchase or licensing via the image repository;
   each said transformed target digital image is protected using digital rights management and includes an option that is selectable to remove the protection upon licensing or purchase of a respective said candidate digital image used to generate a respective said transformation.

10. In a digital medium environment to transform a target digital image using image processing, a method implemented by at least one computing device, the method comprising:
    receiving, by the at least one computing device, the target digital image and search context data relating to the target digital image;
    obtaining, by the at least one computing device, a plurality of candidate digital images from an image repository based on the target digital image and a search of a plurality of digital images in the image repository using the search context data;
    generating, by the at least one computing device, a plurality of transformations to be applied to the target digital image, each said transformation based on a different respective candidate digital image of the plurality of candidate digital images;
    generating, by the at least one computing device, a plurality of transformed target digital images through application of the plurality of transformations to the target digital image; and
    visually outputting, by the at least one computing device, the plurality of transformed target digital images.

11. The method as described in claim 10, wherein the search context data specifies content that is to be used to replace content in the target digital image.

12. The method as described in claim 11, wherein the search context data is configured as text.

13. The method as described in claim 11, wherein the search context data is configured as at least a portion of another digital image.

14. The method as described in claim 10, wherein the search context data is configured to specify a portion of the target digital image that is not to be used as a basis to obtain the plurality of candidate digital images.

15. The method as described in claim 10, wherein the generating of the plurality of transformed target digital images or the generating of the plurality of transformations is based at least in part on semantic labels of the target digital image and semantic labels of the plurality of candidate digital images.

16. The method as described in claim 10, wherein:
the plurality of candidate digital images is made available for purchase or licensing via the image repository;
each said transformed target digital image is protected using digital rights management and includes an option that is selectable to remove the protection upon licensing or purchase of a respective said candidate digital image used to generate a respective said transformation of the respective said candidate digital image.

17. In a digital medium environment to visually transform a target digital image using image processing, a system comprising:
an image repository management system implemented at least in part in hardware of at least one computing device to manage a plurality of candidate digital images maintained in an image repository; and
an image processing management system implemented at least in part in hardware of the at least one computing device to:
generate a plurality of visually transformed target digital images by visually transforming the target digital image based on the plurality of candidate digital images;
associate digital rights management protection as part of the plurality of visually transformed target digital images;
visually expose the plurality of visually transformed target digital images for output as having the associated digital rights management protection; and
remove digital rights management protection from a respective said visually transformed target digital image responsive to validation of user credentials to license or purchase a corresponding said candidate digital image.

18. The system as described in claim 17, wherein the image processing management system is further configured to generate a plurality of visual transformations from respective ones of the plurality of candidate digital images that are used to generate the plurality of visually transformed target digital images.

19. The system as described in claim 18, wherein the plurality of visual transformations are configured to fill a portion of the target digital image as part of a hole filling operation.

20. The system as described in claim 17, wherein the image processing management system is further configured to:
generate a plurality of image ranking scores for respective ones of the plurality of visually transformed target digital images, the plurality of image ranking scores being indicative of an amount of realism reflected in the plurality of visually transformed target digital images through use of machine learning; and
rank the plurality of visually transformed target digital images based on the plurality of image ranking scores.

* * * * *